(12) United States Patent
Aoki

(10) Patent No.: US 6,748,530 B1
(45) Date of Patent: Jun. 8, 2004

(54) CERTIFICATION APPARATUS AND METHOD

(75) Inventor: Ryuichi Aoki, Kawasaki (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 09/420,568

(22) Filed: Oct. 19, 1999

(30) Foreign Application Priority Data

Nov. 12, 1998 (JP) .......................................... 10-321891

(51) Int. Cl.[7] .................................................. G06F 1/24
(52) U.S. Cl. ........................ 713/156; 713/161; 713/168; 713/175
(58) Field of Search ............................... 713/156, 161, 713/168, 175, 182, 200, 201

(56) References Cited

U.S. PATENT DOCUMENTS 4,549,075 A * 10/1985 Saada et al. ................. 713/169
5,537,475 A * 7/1996 Micali .......................... 380/30
5,717,759 A * 2/1998 Micali .......................... 713/157

FOREIGN PATENT DOCUMENTS

JP  A-11-15373  1/1999

* cited by examiner

Primary Examiner—Thomas R. Peeso
(74) Attorney, Agent, or Firm—Oliff & Berridge, PLC

(57) ABSTRACT

Certification will be performed without the use of any external certification organizations in an organization such as an enterprise. A server and a plurality of clients are connected via a network to thereby constitute a certification system for the entire enterprise. A public secondary memory in the server holds a server name, a certificate list, a temporary registrant list and the like. The certificate list includes individual and group certificates, and the certificate includes specifying information on a certification target, a public key and signature by an responsible person of a group, to which the certification target belongs. The group responsible person signs the public key of the group member and specifying information by using the information on a registrant list to generate a certificate.

19 Claims, 26 Drawing Sheets

| GROUP CERTIFICATE | SPECIFYING INFORMATION OF GROUP CONCERNED | $G_{1I}$ |
|---|---|---|
| | CLASSIFICATION INFORMATION OF GROUP CONCERNED (PRESENCE OR ABSENCE OF AUTHENTICATION ABILITY) | $G_{1kind}$ |
| | SPECIFYING INFORMATION OF IMMEDIATELY ABOVE GROUP | $G_{0I}$ |
| | PUBLIC KEY OF GROUP CONCERNED | $G_{1P}$ |
| | PRIVATE KEY OF THE GROUP CONCERNED, ENCRYPTED FOR THE RESPONSIBLE PERSON OF IMMEDIATELY ABOVE GROUP | $G_{0P}(G_{1S})$ |
| | PRIVATE KEY OF GROUP CONCERNED, ENCRYPTED FOR EACH RESPONSIBLE PERSON OF GROUP CONCERNED | $G_{R1P}(G_{1S})$ |
| | DITTO | $G_{R2P}(G_{1S})$ |
| | DITTO | ⋮ |
| | DITTO | $G_{RnP}(G_{1S})$ |
| | PUBLIC KEY FOR GROUP MEMBER CONCERNED | $G_{1MP}$ |
| | PRIVATE KEY OF THE GROUP MEMBER CONCERNED WHICH IS ENCRYPTED FOR RESPONSIBLE PERSONS OF GROUP CONCERNED | $G_{1S}(G_{1MS})$ |
| | SIGNATURE BLOCK OF ELECTRONIC SIGNATURE MADE BY A RESPONSIBLE PERSON OF IMMEDIATELY ABOVE GROUP | $Sig(G_{0S})$ |
| | INFORMATION INDICATING AUTHORIZATION BY IMMEDIATELY ABOVE GROUP GIVEN BY RESPONSIBLE PERSON OF GROUP CONCERNED | $G_{0I}$ |
| | PRIVATE KEY OF THE GROUP MEMBER CONCERNED, ENCRYPTED | $M_{1P}(G_{1MS})$ |
| | DITTO | $M_{2P}(G_{1MS})$ |
| | DITTO | ⋮ |
| | DITTO | $M_{nP}(G_{1MS})$ |
| | SIGNATURE BLOCK OF ELECTRONIC SIGNATURE MADE BY RESPONSIBLE PERSON OF GROUP CONCERNED | $Sig(G_{1S})$ |

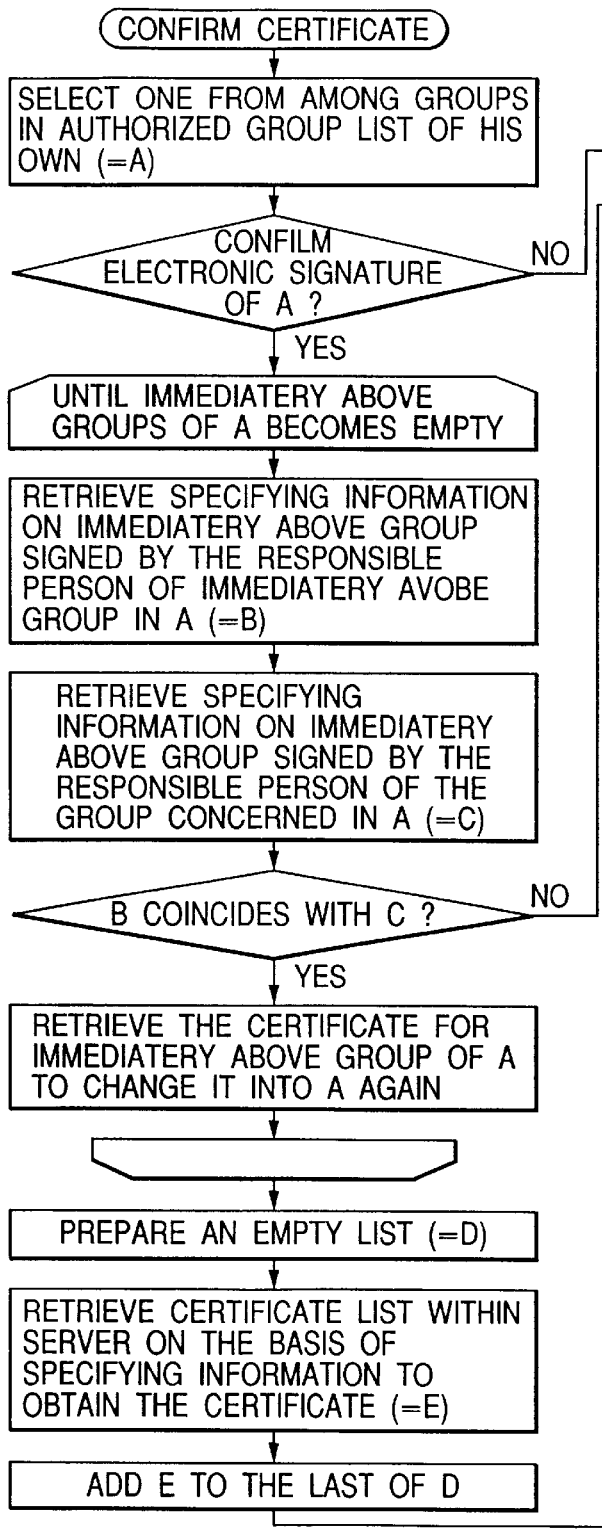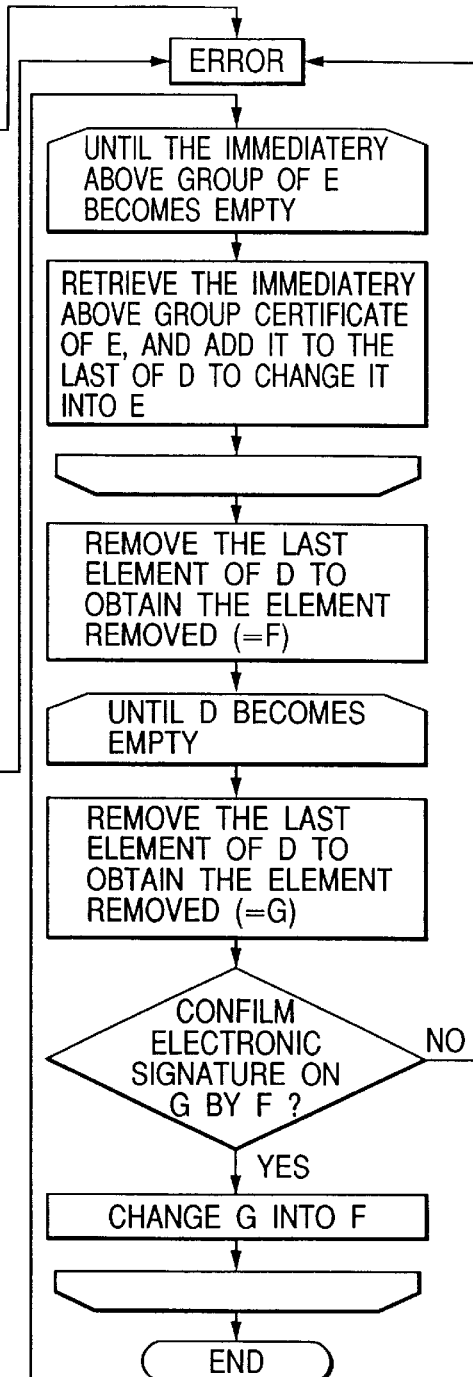
FIG. 35

CERTIFICATION APPARATUS AND METHOD

BACKGROUND OF THE INVENTION

1. Field of the Invention

The present invention relates to certification technique whereby certification is performed in an organization such as an enterprise.

2. Description of the Related Art

In the case of using a public cryptography method, assurance of correspondence between a public key and the person himself is required. This assurance is called "certification". As a mechanism for providing this certification, there is Certification Authority (hereinafter, called also "CA"). The CA is a fair third party system for assuring a correspondence relation between the public key and the person himself, and this is being popularly used for certification. In this method, the CA issues, as a certificate, electronic data electronically signed using the private key of CA on information indicating correspondence between a certification target (natural individual or legal person) and its public key. A third party, who places its confidence in the CA, confirms the contents (signature) of the certificate using the public key of CA, whereby the third party accepts that the correspondence relation between the public keys of an individual and an individual is legitimate.

If the conventional CA is used within an enterprise, the following problems will occur:

(1) A fair third party is required as a manager of CA. If such a management job is entrusted to an external third party organization, the essence of the internal security system would be held by the third party.

(2) Even if an attempt is made to provide a fair third party within the company, an employee within the company will become the individual concerned (an individual to be certified). The enterprise side also desires to prevent a specific manager from holding the essence of the security system, and the manager does not desire to manage important information either (he is very likely to be suspected if a problem such as divulgation arises).

(3) Within an enterprise, since activities are performed in units of groups, which are an aggregate of individuals or groups such as a department or a section, it is desirable to establish a right such as reference right for information in units of groups. Accordingly, it becomes necessary to correctly assure the individual or group, which is an element of the group, but the conventional CA does not have such ability.

(4) In the CA, the fair third party identifies by some method that a person to be certified is the person himself, but since generally the CA's manager is not acquainted with the person to be certified, there is no method for the identification except some method left to the CA's decision among methods such as correspondence to mail address, non-duplication of the name, and backing using a public certificate. Since there are diversified methods in this manner, variations occur in the degree of reliability of the identification. Even if we may rely on the public certificate, we are powerless against false papers for it. Within the enterprise, an employee's identification card may be the public certificate, but it costs for an applicant to meet the manager with his employee's identification card.

The present applicant has proposed a cryptography technique in units of groups (Japanese Published Unexamined Patent Application No. 11-015373). This technique enables information control in units of groups to the public key cryptography technique, that is, decoding and electronic signature. In order to perform the information control in units of groups, it is necessary to maintain the legitimacy of a member of the group. This is because if an illegitimate member can be added, the illegitimate member could use the rights given to the group. For this reason, in the Japanese Published Unexamined Patent Application No. 11-015373, there was provided ability to legitimately change the group members. However, no certification ability is included in the Japanese Published Unexamined Patent Application No. 11-015373. More specifically, there is not included ability to assure the correspondence relation between an individual and the public key, and the correspondence relation between a group and the public key.

Even in a general CA, there exists a system in which a plurality of CAs form a hierarchical structure. Concretely, a higher level CA places its electronic signature on information indicating the correspondence relation between its lower level CA and its public key. Thus, if the public key for the higher level CA is known, the information indicating the public key for the lower level CA electronically signed is confirmed, whereby the public key for the lower level CA can be also correctly known. In this system, however, although the hierarchical structure is formed, a fair third party is still required. Also, since the CA is service, it is difficult to bring the group into correspondence with the CA, and the group cannot be controlled. Further, the basis for the certification remains the same as before, and the degree of reliability varies.

SUMMARY OF THE INVENTION

The present invention has been achieved in consideration of the above-described state of affairs, and is aimed to provide a certification technique suitable for performing a certification in an organization such as an enterprise.

Hereinafter, the description will be made of the present invention. The present invention enables the certification of an individual and an organization using a hierarchy of the organization. A responsible person of each group ought to certainly know other groups and individuals directly belonging to the group, and performs the certification on the basis thereof. This has the following effects:

(1) The certification can be performed without necessitating the existence of any fair third party.

(2) Uniform and fair certification can be performed on the basis of acquaintance with the members which the responsible person of the group has.

(3) The group can be handled.

(4) The certification can be performed by the in-house alone.

More specifically, according to the present invention, in order to achieve the above-described object, a certification apparatus for performing certification for an individual and a group in an organization constructed by hierarchically arranging a group having at least one of an individual and a group as a constituent member, is provided with: a confirmation process unit for confirming the certification target on the basis of communication between a responsible person of a group and a certification target belonging to the group; and a certificate generating unit for generating a certificate for the certification target by placing the signature on signature-target information including a public key for the certification target and specifying information on the certification target by a private key used by the responsible person of the group.

In this structure, a certification scheme is hierarchically constructed with the responsible person of the group as a nucleus, and therefore, the effects of (1) to (4) described above can be achieved.

In this structure, a unit for keeping the certificate may be further provided. Of course, the certificate may be sent to the user. Also, the signature-target information may further include specifying information on the group.

Also, a certificate having a group as a certification target may further include specifying information on each of members of the group, and signature information comprising the specifying information signed by the private key of the responsible person of the group.

Also, the certificate having a group as a certification target may further include a shared public key of members of the group encrypted by respective public keys of members of the group; a shared public key of members of the group; and signature information comprising at least the members' shared private key encrypted, signed by the private key of the responsible person of the group.

Also, a private key used by the responsible person of the group encrypted by a public key corresponding to a private key used by a responsible person of a group in a higher level hierarchy of the group may be further included in the certificate. In this case, the private key used by the responsible person of the group may be set independently of an individual private key of the responsible person, the private key used by the responsible person of the group encrypted by the individual public key of the responsible person of the group may be included in the certificate.

Also, on generating the certificate, a confirming unit of the group using the certification target based on the communication between the responsible person of the group and the certification target belonging to the group may be further provided for the certification apparatus.

Also, the signature-target information may include information having classification of the signature target described therein. The classification means, for example, difference between temporary registration and genuine registration, presence or absence of certification ability and the like. For example, a friendship group and a task force can be designated to have no authentication ability.

Also, along with communication between the responsible person of the group and the certification target belonging to the group, it may be possible for the certification target belonging to the group to receive specifying information on the group and the private key for the group for signing by the private key of the certification target itself.

Also, along with the communication between the responsible person of the group and the certification target belonging to the group, it may be possible for the certification target belonging to the group to receive specifying information on the group and the private key for the group for signing by the private key of the certification target itself, and to allow the certification target to be kept in such a manner as to be made available.

Also, it goes without saying that the present invention is implementable both as a mode of the method and as a mode of the computer program. Also, in place of the confirmation process of the certification target based on communication between the responsible person of the group and the certification target belonging to the group or a responsible person of the certification target, it is possible to use the existing credit scheme (diversion and the like of a confirmation document and the like which have already been used), and to omit the confirmation process.

BRIEF DESCRIPTION OF THE DRAWINGS

FIG. 17 is an explanatory view showing a concrete example of a group certificate;

FIG. 35 is a flow-chart for explaining an operation of confirming a certificate.

DETAILED DESCRIPTION OF PREFERRED EMBODIMENT

Figure 1:
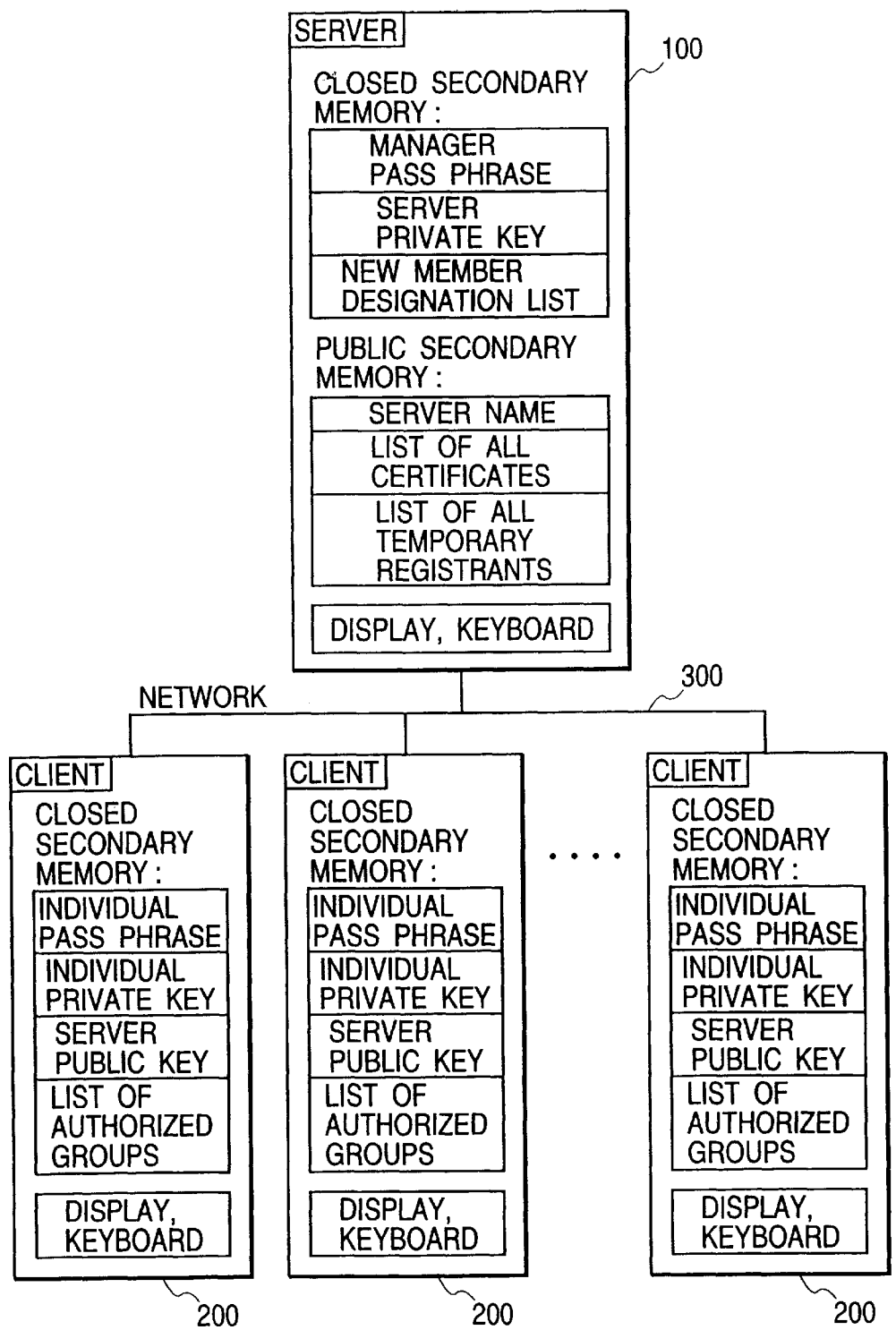
FIG. 1 is a block diagram showing a system configuration of an embodiment according to the present invention.

Hereinafter, the detailed description will be made of the present invention.

Outline of Function (1) Certification of Member

First the basic function is for a group G (properly speaking, a responsible person $G_R$ of the group G) to certify its member $M_i$. To certify is to place an electronic signature on information indicating correspondence relation between specifying information $M_{iI}$ of a member $M_i$ and a public key $M_{iP}$. A private key used for the electronic signature is a manager's individual private key $G_{RS}$ or an exclusive private key $G_S$ which the group has.

To enable certification means that a confirmation process for certification as well as a certification process must be enabled. To this end, it is necessary to know a public key $G_P$ of the group G and a public key $G_{RP}$ of a group manager $G_R$, which are the reference. If these are known, it becomes possible to certify a direct and indirect member $M_{all}$ of the group G. It can function properly even with this data.

(2) Authorization of Group under Direct Control

In the case of "certification of a member" alone, it will not function if the manager public key $G_{RP}$ of the group or the public key $G_P$ of the group is not known. Therefore, we consider imparting the following function in order to authorize the member.

When a certain member $M_i$ is certified by the group G, it is imposed as the basic function to authorize in the reversed direction. Hence, it is assumed that a certain member $M_i$ can trust the manager public key $G_{RP}$ or the group public key $G_P$ of the group G, to which the member himself belongs. By reflexively applying it, the member $M_{all}$ can trust a management social circle key or the group public key of the group G, to which the member $M_{all}$ indirectly belongs. Together with the function, which "certification of member" has, it is possible to know the public key of the group or individual, which is a member even indirectly, of the group G which regards the member himself as a member even indirectly.

(3) Correspondence to Change in Organization

Further, we consider imparting a function relating to a change in an organization. This is because since a change in an organization occurs within an enterprise, an ability to follow it is necessary. There are 1) a mechanism in which new member candidates are arranged in advance and are authorized once at a certain point of time, 2) a mechanism in which new member candidates are automatically authorized at a designated time, 3) a mechanism in which members are designated by any other than the group responsible person and they are authorized by the responsible person, 4) a mechanism in which if identification of the person himself has been finished, the identification of the person himself is omitted, and 5) a mechanism in which if authorization has already been given by the higher level group, the confirmation by them is omitted.

Also, it is also made possible to hold an additional post and implement a task of an individual.

Embodiments

Hereinafter, the concrete description will be made of the present invention.

Definition of Terms

In the following description, the following terms will be used.

TABLE 1

Definition of Terms

| Terms | Notation | Meaning |
|---|---|---|
| Individual | P | A so-called individual, and does not contain any legal person. It does not directly mean a role or an execution position such as "personal manager". |
| Group | G | Aggregation having 0 or more persons of individuals and other groups of 0 or more as direct members. |
| Member | M | An individual or a group constituting a group. |
| All members | $M_{all}$ | Individuals directly or indirectly constituting a group. |
| Role | | Means an execution position or a role such as "personnel department manager" or "person in charge of authorization of request from a general affairs department for purchasing". It is the same as the group as a mechanism. Hereinafter, the role is also included in the group. |
| Responsible person | $G_R$ | An individual having authority to designate a member in the group, and there is at least one person in each group. |
| Public key | $X_P$ | A public key of the public key cryptography system. It is used in the encipherment and signature confirmation. |
| Private key | $X_S$ | A private key of the public key cryptography system. It is used in decoding and signature. |
| Specifying information | $X_I$ | Information required for a man to specify an individual or a group. Although there are no definite provisions, both the employee number and name may be placed side by side for an individual. It is not an identifier. Conversely, it may be possible not to allow overlapping as an identifier. In the case of overlapping, it will be judged from one's position and other additional information. |
| Certificate | $X_C$ | A pair of the public key and the specifying information electronically signed by a verifier. If you know the public key of the verifier and trust the verifier, you will be able to know the public key for an individual or a group to be specified by the specifying information if you have a certificate. |

TABLE 1-continued

Definition of Terms

| Terms | Notation | Meaning |
| --- | --- | --- |
| Certification | | To assure the person himself of the public key. Although a word of assurance is used, the degree of assurance is diversified. |
| Identification of the person himself | | When certifying an individual at the individual's request, a process to confirm that the specifying information submitted by the individual specifies that individual. |
| Group classification | $G_{kind}$ | It shows the classification of the group indicating presence or absence of the certification ability, an object of utilization and the like. |

Details of Certification Mechanism (1) System Configuration

FIG. 1 shows the system configuration of the present embodiment, and this system supervises the certification in an enterprise, of course, the organization of the enterprise may be divided to perform the certification in units of the division, and may be separated for each level of security for certification. In FIG. 1, a server 100 and a plurality of clients 200 are connected via a network 300. The network 300 connects all the systems of the enterprises, and is constructed by connecting LAN or LAN segments by WAN. Since the server 100 and the clients 200 have ordinary resources of computer system, and are the same in structure as the ordinary ones, the description will be omitted. The server 100 has a closed secondary memory 101 and a public secondary memory 102. The client 200 has a closed secondary memory 201. Information in the closed secondary memory 101 and 201 cannot be directly referred to from others. Information in the public secondary memory 102 can be freely referred to from others, but cannot be changed by others.

The closed secondary memory 101 in the server 100 holds a manager pass phrase, a server private key, a new member designation list, and the like. The public secondary memory 102 in the server 100 holds a server name, an all certificate list, an all temporary registrant list and the like. The closed secondary memory 201 in the client 200 holds an individual pass phrase, an individual private key, a server public key, an authorized group list and the like.

(2) Certification based on Group Hierarchy

By a private key $G_{ORS}$ of a responsible person $G_{OR}$ of a group $G_0$, a pair of specifying information $M_{iI}$ and a public key $M_{iP}$ of a member $M_i$ (0<i<=n, 0<=n) of the group will be signed. If, however, the member is a group (=$G_i$), a pair of specifying information $G_{iI}$ of a group $G_i$ and a public key $G_{iRP}$ of its responsible person $G_{iR}$ will be signed. Thus, if you know the public key of the responsible person $G_{OR}$ of the group $G_0$, you will be able to know the public key of its direct member $M_i$. If the member $M_i$ is the group $G_i$, you will be able to know a responsible person public key $G_{iRP}$ of the group $G_i$. By reflexively applying this process, it is possible to also know the public key of an indirect member of the group $G_0$.

Figure 2:
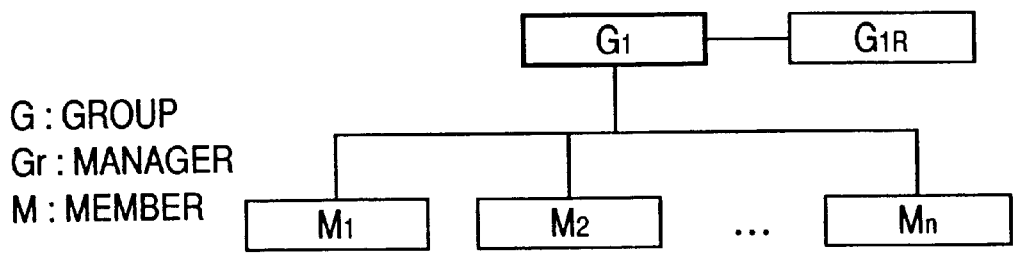
FIG. 2 is an explanatory view showing a group hierarchy in the above-described embodiment.

FIG. 2 shows relation between a group, a manager and members in the case of an one-hierarchy. In FIG. 2, the group $G_1$ is composed of members $M_i$, and its responsible person $G_{1R}$ represents the group. A pair of specifying information $M_{iI}$ and a public key $M_{iP}$ of a member $M_i$ will be signed by the private key $G_{1RS}$ of the responsible person $G_{1R}$.

FIG. 2 shows data necessary in the case of one hierarchy (a rectangle in bold strokes indicates data). $G_{1RP}$ above at the right is a manager public key of a group $G_1$, which serves as a reference. In order to know the public key of each member using this method, it is a precondition to know this $G_{1RP}$ in some way. As regards where this information exists, nothing has been specified on this level, but it may be opened to the public by, for example, the service. The three rectangles vertically arranged on the lower side show 1) public information of a member, 2) a public key of the member and 3) a signature block of signature by a private key of the group responsible person from above. The signature block is thus shaded in light color, and the signature range is indicated by a brace and an arrow. Where this information is held can be changed in various ways. A process, in which it is held in, for example, the service, and is specified by looking for $M_{iI}$ to return the corresponding $M_{iP}$ is assumed to be provided by the service, and it is used in that process. The rectangles in bold strokes at the lowest stage are a private key for each member, and these are controlled by each member.

Figure 4:
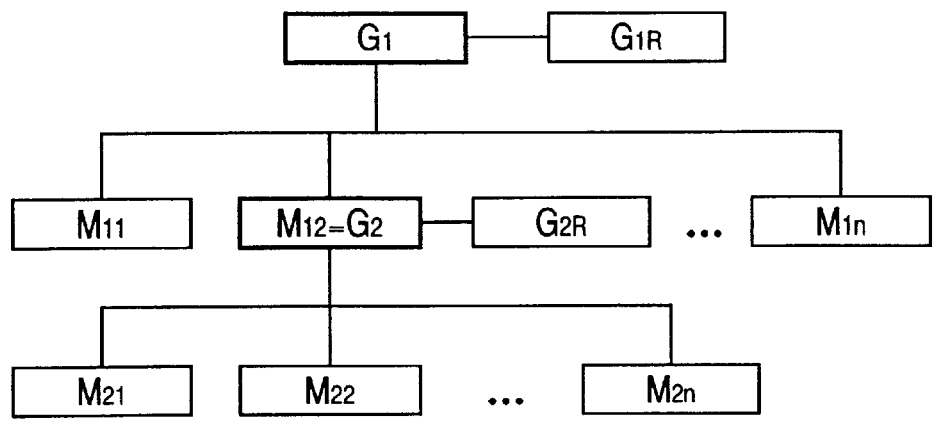
FIG. 4 is a view in which a member of the group explains a case of the group in the embodiment.
Figure 5:
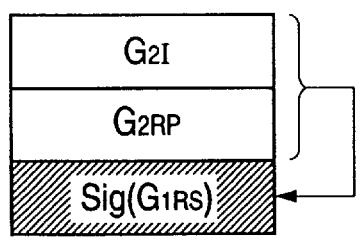
FIG. 5 is an explanatory view showing data for certification used in FIG. 4.

FIG. 4 shows relation between a group, a manager and members when the group is nested if the member is a group. In this case, necessary data is the substantially same as in the case of the one hierarchy. It is when the member is a group that caution should be required, and data corresponding to G2 of FIG. 4 is as shown in FIG. 5.

(3) Identification of the person himself by acquaintance or the like

When the responsible person $G_{OR}$ of the group $G_0$ identifies a member, the responsible person $G_{OR}$ utilizes a fact that he is personally acquainted with the member $M_i$. Concretely, several methods are considered.

First Method

First, the member $M_i$ temporarily registers. The registration is performed when the member $M_i$ instructs to a temporary registration sub-system in the client 200 to temporarily register. Specifying information $M_{iI}$ of his own is inputted into the client 200 (the specifying information $M_{iI}$ may be inputted by any arbitrary person, and when inputted by another person, the person himself only selects the information thus inputted). The temporary registration sub-system generates, in the client 200, a pair of the private key $M_{iS}$ and the public key $M_{iP}$, and registers a pair of the public key $M_{iP}$ and specifying information $M_{iI}$ in the server 100. This pair registered is in a state in which the designation by an individual who is merely likely to be the member $M_i$ has been registered as it is, and there is no assurance of the legitimacy of the pair. For this reason, it is called "temporary registration".

The responsible person $G_{OR}$ selects the member $M_i$ of the group $G_0$ from among temporarily-registered individuals. Since, however, whether or not the member $M_i$ temporarily registered is the person himself is obscure, the responsible person confirms the specifying information $M_{iI}$ by directly meeting the member $M_i$ himself, or by telephone or the like. If the member and other temporary registrants do not overlap in the specifying information, the person himself can recognize that the specifying information is correct. This is because the responsible person $G_{OR}$ is acquainted with the member $M_i$ and the specifying information designated by the member $M_i$ himself does not exist elsewhere (in the case of a method in which the specifying information $M_{iI}$ is inputted by another person, it is confirmed whether or not temporary registration has been performed by selecting the specifying information $M_{iI}$. Since temporary registration can be performed only once for the same specifying information $M_{iI}$, $M_i$ cannot be temporarily registered if any other than $M_i$ has temporarily registered.) For this reason, it is confirmed that the public key $M_{iP}$ designated together with the specifying information $M_{iI}$ is correct, and assurance can be provided.

Second Method

Temporary registration is performed as in the case of the first method. In the first method, the responsible person $G_{OR}$ may neglect the confirmation. For this reason, the responsible person $G_{OR}$ imparts information on appropriate character string and the like to information corresponding to a candidate $M_i$ for the member after the temporary registration, or the service automatically imparts so that the responsible person notifies the member $M_i$ of the information orally or by a method such as telephone. The member $M_i$ notifies the service of the information notified. Plural methods can be considered as a way of notifying, but a method of placing an electronic signature by the private key $M_{iS}$ to notify the service for verifying the signature prevents any illegitimacy or neglected confirmation.

Third Method

Temporary registration is performed as in the case of the first method. At that time, the member $G_{iRP}$ inputs also a mail address $M_{iA}$ of his own. Then, the service generates information such as random character strings to its mail address $M_{iA}$, and the service likewise encrypts by the public key $M_{iP}$ to send it to a mail address $M_{iA}$ designated by mail. The individual decodes the information received by mail by the private key $M_{iS}$ to notify the service. If the information received coincides, the service assures of the correspondence with the mail address. This process is finished to terminate the temporary registration.

In accordance with the mail address $M_{iA}$ as well as the specifying information $M_{iI}$ the responsible person $G_{OR}$ judges a candidate $M_i$ for the temporarily-registered member for legitimacy.

Of course, this method cannot be used if the responsible person $G_{OR}$ knows the mail address of the member $M_i$ and cannot trust the correspondence relation between the mail address and the member.

(4) Authorization of an individual who has been already a member of another group When authorizing an individual who has already been a member of another group, it is also possible in practical use to omit the identification of the person himself by believing that the identification of the person himself performed previously might have been sufficiently performed. To be exact, if a group, to which an individual, who is going to become a member, currently belongs, is known and identification of the person himself in the group is sufficient, the identification of the person himself can be omitted.

If the manager $G_{1R}$ of a group $G_1$, which is going to be authorized, knows the public key $G_{ORP}$ of the manager $G_{OR}$ of the group $G_0$ and an individual P to be authorized is a direct or indirect member of the group $G_0$, the correspondence relation between the public key $P_P$ and the specifying information $P_I$ of the individual P has already been assured to $G_{1R}$. Therefore, the identification of the person himself can be omitted.

In a case where the individual P has already been a member of another group, the identification of the person himself will be omitted after the system confirms the omission of the identification of the person himself at the responsible person $G_{1R}$, or automatically.

(5) Issue of Individual Certificate

In order to assure of the correspondence relation between the public key $P_P$ and the specifying information $P_I$ of the individual P even offline (without using any service provided by the server 100), there is, as an individual certificate $P_C$, issued pair information of the public key $P_P$ and the specifying information $P_I$, which has been electronically signed by the private key of the responsible person $G_{1R}$ of the group $G_1$, to which the individual P ($=M_i$) directly belongs.

In order to make the most of the individual certificate $P_C$, however, the public key $G_{1RP}$ of the responsible person $G_{1R}$ of the group $G_1$ must be known. If the $G_{1RP}$ is known, the correspondence relation between $P_P$ and $P_I$ can be confirmed by confirming the electronic signature from only the individual certificate $P_C$ even offline (without accessing the service).

Figure 3:
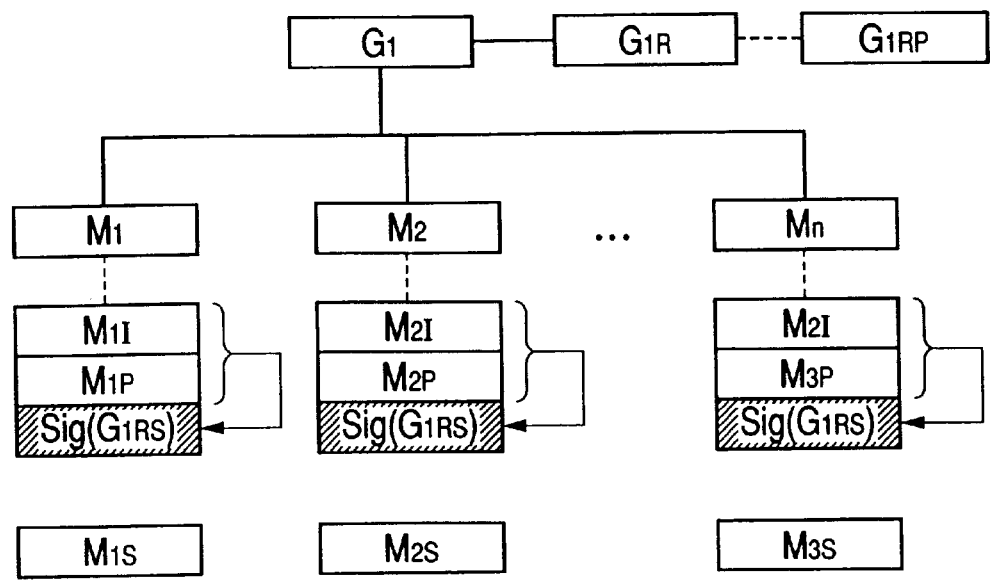
FIG. 3 is an explanatory view showing data for certification in the group hierarchy of FIG. 2.
Figure 6:
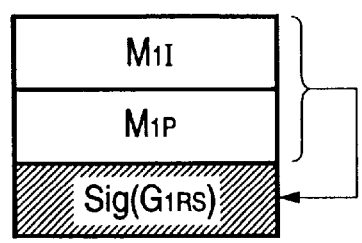
FIG. 6 is an explanatory view showing data for certification in the embodiment.

By opening such data (shown also in FIG. 3) as shown in FIG. 6 to the public, the member public key is acquired or confirmed offline.

(6) Issue of Group Certificate

A certificate $G_C$ for a group is issued. This certificate enables the ability of the group to be utilized even offline. Concretely, there is, as a group certificate $G_{1C}$ (FIG. 7), issued pair information of the specifying information $G_{1I}$ and the public key $G_{1RP}$ of the responsible person $G_{1R}$ of the group, which has been electronically signed by the responsible person private key $G_{ORS}$ of the immediately above group $G_0$.

In order to confirm the correspondence relation between the public key $P_P$ and the specifying information $P_I$ of an individual P using a group certificate, it is necessary to know the responsible person public key $G_{nRP}$ of the group $G_n$ having the individual P as one of its direct members. If the $G_{nRP}$ is not yet known, the $G_{nRP}$ can be confirmed on the assumption that the $G_{n-1RP}$ would be known through the use of a certificate of the group $G_n$ and the responsible person public key $G_{n-1RP}$ of the immediately above group $G_{n-1}$ of $G_n$. In this way, $G_{iRP}$ (0<=i<=n) is confirmed in order, such a process is advanced up to i=0, which is already known, and $G_{nRP}$ is confirmed on the basis of $G_{ORP}$, which is already known, and further the correspondence relation between $P_P$ and $P_I$ is confirmed. (This process includes a process for confirming the correspondence relation between the responsible person public key $G_{nRP}$ and the specifying information $G_{nI}$ of the group $G_n$).

Figure 7:
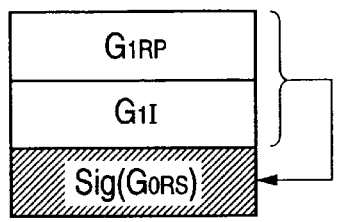
FIG. 7 is an explanatory view showing data for certification for a group in the embodiment.

By opening such information as shown in FIG. 7 to the public although also shown in FIG. 5, it is made possible to acquire or confirm the responsible person public key of a group offline. Here, $G_1$ designates the group concerned, and $G_0$ designates the immediately above group.

(7) Inclusion of Immediately Above Group Information in Certificate

As regards the immediately above group $G_0$ of a member $M_1$, the responsible person $G_{OR}$ of the immediately above group $G_0$ can know. This is because $G_{OR}$ electronically signs on information concerning $M_i$, that is, assures of the legitimacy of the information. More specifically, there does not exist any immediately below member which is not designated by the responsible person $G_{OR}$ of the immediately above group $G_0$. For this reason, it is easy to include information specifying the immediately above group of $M_i$ in a certificate $M_C$ of a member $M_i$. Also, in order to confirm the contents of a certain certificate $M_C$, it must be confirmed that the certificate $M_C$ has been electronically signed by the responsible person $G_{OR}$ of the immediately above group $G_0$ of the member M. Therefore, on viewing the certificate $M_C$, it is convenient to obtain the group $G_0$ corresponding to the private key $G_{ORP}$, by which the certificate $M_C$ has been electronically signed, from the certificate $M_C$. Also, there is no risk due to inclusion of the specifying information of the immediately above group.

Figure 8:
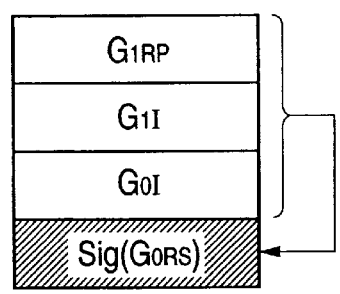
FIG. 8 is an explanatory view showing data for certification including specifying information on an immediately above group.

FIG. 8 shows this construction. As compared with the construction of FIG. 7, the specifying information $G_{OI}$ of the immediately above group $G_0$ is added.

Also, even in the case of holding information of a format, which is not a certificate, that is, the format of FIG. 5 in the service, this format as shown in FIG. 6 becomes effective. Hereinafter, the format of certificate will be described, and it will become effective even in the in-service holding format.

(8) Enumeration of Members using Group Certificate

To follow members $M_i$ from the group $G_1$ is effective because all members can be enumerated from the group. Since information indicating the immediately above group $G_1$ is included in the certificate $M_C$ for each member $M_i$, it is possible to enumerate the member $M_i$ by retrieving all certificates $M_{iC}$, in which the person himself is likely to be a member, and moreover, if information on the immediately below member is included in the certificate of the group $G_1$ in advance, it becomes possible to easily enumerate them.

The member $M_i$ is designated by right of the responsible person $G_{1R}$ of the group $G_1$ concerned, and only the responsible person $G_{1R}$ of the group $G_1$ concerned must be able to change the member. To the end, the member information must have been electronically signed by the private key $G_{1RP}$ of the responsible person $G_{1R}$ of the group $G_1$ concerned. Also, the electronic signature of the responsible person $G_{OR}$ of the immediately above group $G_0$ of the group $G_1$ concerned must not be required. This is because no change will be possible to make without any permission by the responsible person $G_{OR}$ of the immediately above group $G_0$ if such electronic signature is required.

In order to make this possible, member list information (for example, set of specifying information $M_{iI}$ of each member $M_i$) is imparted to the certificate of the group $G_1$, only a pair of the responsible person public key $G_{1RP}$ and the group specifying information $G_{1I}$ is electronically signed by the responsible person $G_{OR}$ of the immediately above group $G_0$, and the member list information is electronically signed by the responsible person $G_{1R}$ of the group concerned. Other portions may be covered with the signature of the responsible person $G_{1R}$ of the group concerned (for example, the entire certificate is electronically signed by $G_{1R}$).

Figure 9:
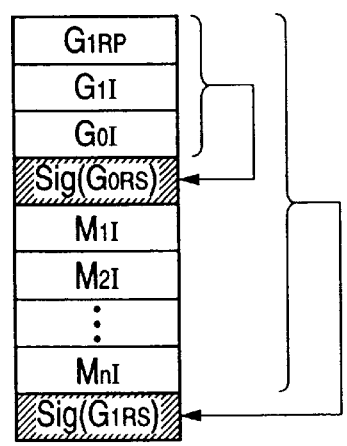
FIG. 9 is an explanatory view showing data for certification further including information on a group member.

In FIG. 9, a list of public information $M_{iI}$ of the members is added as a member list.

(9) Division into Groups

By including a group lock proposed in Japanese Published Unexamined Patent Application No. 11-015373 in a group certificate, it is made possible to utilize the group certificate as the group lock. Concretely, a pair of the public key $G_{MP}$ and the private key $G_{MS}$ is allocated to each group G. This private key $G_{MS}$ can be utilized only by a member $M_i$ of the group. For this reason, they will be called the member public key $G_{MP}$ and the member private key $G_{MS}$ respectively. Since the member private key $G_{MS}$ can be utilized only by the member $M_i$, only the member $M_i$ utilizes it for encipherment which can be decoded, and the like.

A member list in the group certificate is made into a shape conforming to the proposal in the Japanese Published Unexamined Patent Application No. 11-015373, that is, a list obtained by encrypting the member private key GMS by the individual public key $M_{iP}$ (or the member public key of the group which is a member) of each member $M_i$ to placing ciphers thus obtained side by side in a number corresponding to the number of the members. Since this is, of course, a member list, the whole is signed by the responsible person private key $G_{1RS}$. This construction is shown in FIG. 9.

Figure 10:
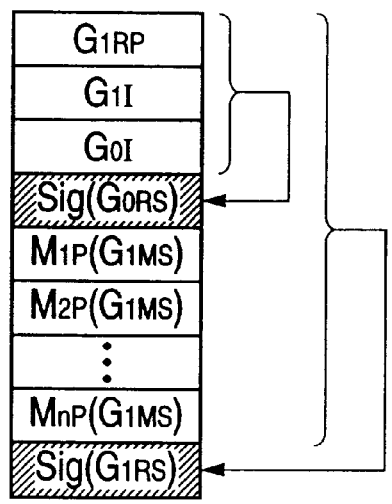
FIG. 10 is an explanatory view showing data for certification including a group lock.

In the member list of FIG. 10, $M_{iP}$ ($G_{1MS}$) is regarded as an element. This notation of $X_P$ (Y) indicates Y encrypted by the public key $X_P$ of X.

(10) Addition of Member Public Key to Group

Since it is used during encrypting to the group $G_1$, it is effective to be able to specify the member public key $G_{1MP}$ from the group certificate $G_{1C}$ offline. To the end, $G_{1MP}$ is added to the group certificate $G_{1C}$.

Concretely, it is necessary to prevent the member public key $G_{1MP}$ from being changed by the third party. This is because a secret (information which can be decoded only by the members) within the limits of the members of the group $G_1$ is to leak to others. For this reason, the member public key $G_{1MP}$ is arranged within an electronic signature range by the group responsible person $G_{1R}$ or an electronic signature range by the immediately above group responsible person $G_{OR}$.

Figure 11:
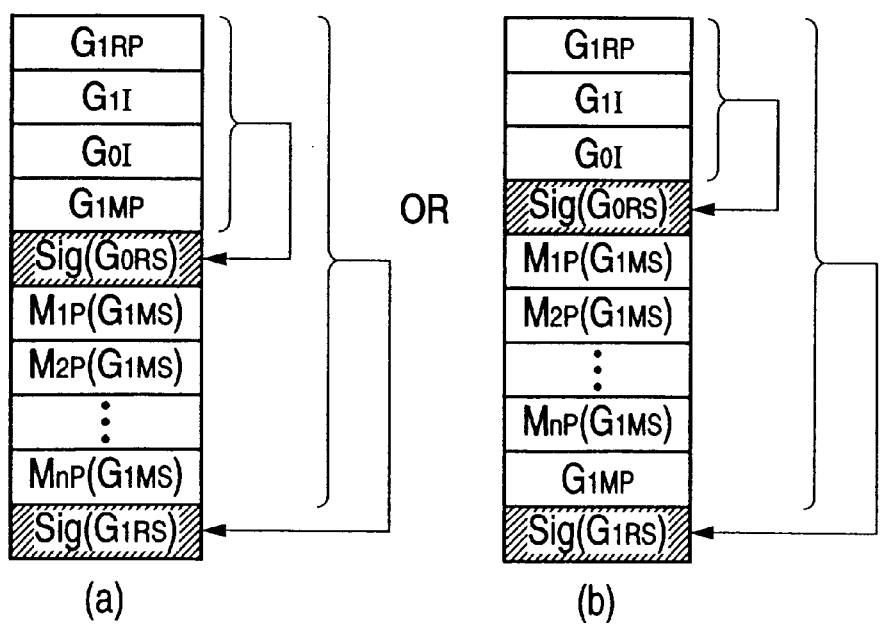
FIG. 11 is an explanatory view showing data for certification including a group lock and a group member public key.

FIG. 11A shows the inclusion of the member public key $G_{1MP}$ within the electronic signature range of the immediately above group responsible person $G_{OR}$. FIG. 11B shows the inclusion of the member public key $G_{1MP}$ within the electronic signature range of the responsible person $G_{1R}$ of the group concerned.

(11) Indirect Designation of Responsible Person

To sign the certificate $M_C$ by an individual private key of the responsible person $G_{1RS}$ of the immediately above group may not be preferable because it may be affected by movement or the like of the responsible person of the group $G_1$. Also, there may be some cases where it is desirable to designate two or more responsible persons $G_R$ of the group. For these reasons, there is provided a mechanism for indirectly designating responsible persons.

First, a pair of the public key $G_{1P}$ and the private key $G_{1S}$ is allocated to the group $G_1$. This private key $G_{1S}$ can be utilized only by the responsible person of the group $G_1$. This private key is called "group private key $G_{1S}$". The group private keys $G_{1S}$ encrypted by the individual key $G_{1RiP}$ of each responsible person, as in the case of the member list, using the member private key $G_{MS}$ are placed side by side to form a responsible person list. Thus, what has been performed by the private key of the group responsible person so far is performed by this group private key. More specifically, 1) an electronic signature for a certificate $M_C$ corresponding to an individual or a group which is a direct member, and 2) an electronic signature for a member list of the group $G_1$ concerned will be performed by this group private key $G_{1S}$. Also, the responsible person list is assumed to be within the electronic signature range (electronically signed by the group private key $G_{0S}$ of the immediately above group $G_0$) by the immediately above group $G_0$, and to be designated by right of the responsible person $G_{OR}$ of the immediately above group $G_0$.

Figure 12:
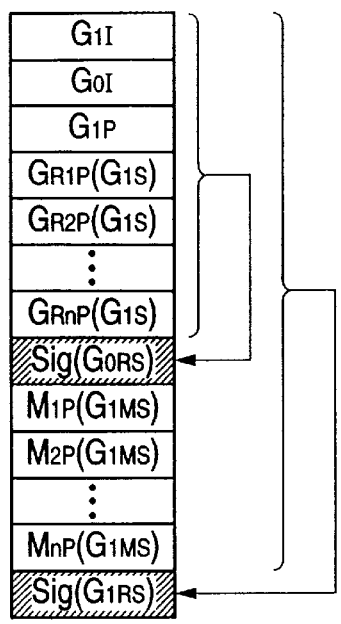
FIG. 12 is an explanatory view showing data for certification in which the group responsible person can be indirectly designated.

FIG. 12 shows an example of the structure of the group certificate $G_{1C}$ in which this extension has been performed. The group public key $G_{1P}$ is included in the group certificate $G_{1C}$ here. Generally, in order to easily acquire the group public key even offline, it is advantageous but not indispensable to include the group public key in the group certificate.

(12) Addition of Responsible Person Private key to Group

On indirectly designating a responsible person, the group private key $G_{1S}$ must be encrypted by the individual public key $G_{1RiP}$ of the responsible person. To the end, there is required a method for the responsible person $G_{ORi}$ of the immediately above group $G_0$ to know the group private key $G_{1S}$ of the group $G_1$. Of course, he knew it when he designated at the beginning, but since it is risky to leave the memory to the individual, and the responsible person $G_{ORi}$ of the immediately above group $G_0$ is also likely to be changed, it is preferable to remember by relating it to the group certificate $G_{1C}$ of the group $G_1$.

To the end, the group private key $G_{1S}$ of the group $G_1$ concerned encrypted by the responsible person public key $G_{OP}$ of the immediately above group $G_0$ is included in the group certificate $G_{1C}$ of the group $G_1$ in advance.

Figure 13:
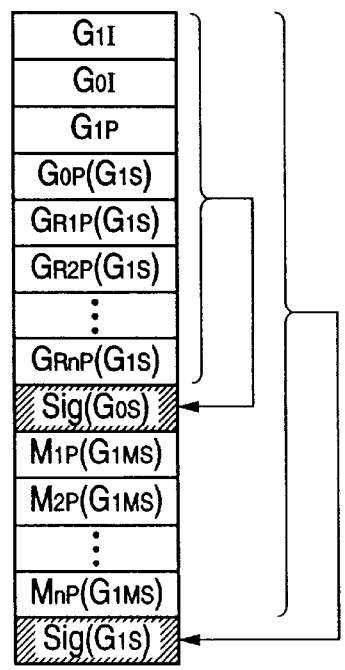
FIG. 13 is an explanatory view showing data for certification in which a private key of the group responsible person can be acquired by the responsible person of the immediately above group.

FIG. 13 shows an example of the structure of the group certificate.

(13) Change of Responsible Person by Responsible Person

A responsible person list provided for indirectly designating the responsible person $G_{1Ri}$ of the group $G_1$ is transferred from the electronic signature range by the group private key $G_{OS}$ of the immediately above group $G_0$ to the electronic signature range by the group private key $G_{1S}$ of the group $G_1$ concerned, whereby the responsible person $G_{1Ri}$ of the group $G_1$ concerned can change the responsible person $G_{1Ri}$.

Even if the immediately above has actually the power to appoint the responsible person, such practical use may be more flexible, and there are usually no risks.

Figure 14:
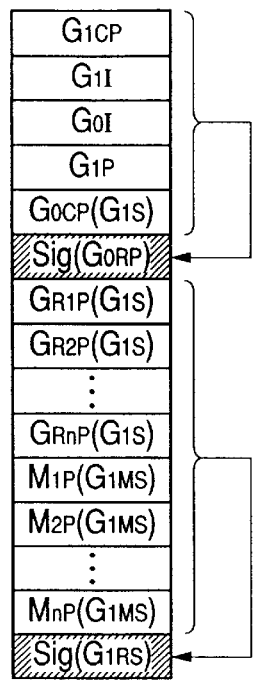
FIG. 14 is an explanatory view showing data for certification, on the basis of which a group responsible person can be changed on a level of a group responsible person.

FIG. 14 shows an example of the structure of a group certificate corresponding thereto.

(14) Drafting and Package Authorization for Member Candidate

Such an individual as the responsible person $G_{1Ri}$ of the group $G_1$ may have no skill and time for performing diversified management by directly interacting with the system. To the end, on changing the member, it is arranged that another person Px can designate a candidate for the new member and that the responsible person $G_{1Ri}$ of the group has only to authorize by confirming the contents.

At that time, there will be required a contrivance for preventing a candidate for the new member from leaking to any other than the group responsible person $G_{1Ri}$ and the drafter Px, a scheme in which the group responsible person $G_{1Ri}$ is notified of a fact of drafting a new member candidate, and the like.

(15) Group having no Signature Ability

In the case of constituting a group representing a task force, a recreation group or the like, there may be desired to constitute such a group that designation and the like of a member $M_i$ are made free so that, for example, the manager $G_{1Ri}$ can freely designate a member, further everyone can freely become a member, and each member $M_i$ can freely withdraw although the approval of the manager $G_{1Ri}$ is required when becoming a member. Such a special group will be called "non-certification group" because it cannot have any certification ability. Also, any groups other than the non-certification group will be specially called "certification group".

The non-certification group has no ability to certify a member although it can designate the member. This is because it designates a member in accordance with a free and unique policy. To the end, an individual, whom the non-certification group has as a member, must have already been certified by the certification group. This is because there is no method whereby the public key of an individual not certified is trusted. However, it is possible for a non-certification group to have another non-certification group as a member.

In order to realize a non-certification group, information indicating the classification of the group is included in the group information (such as group certificate) The information indicating the classification of this group is included in the signature range of the immediately above group $G_0$. If "non-certification group" is recognized from the classification, it is arranged that the member cannot be certified, and if there should be a certificate certified by the non-certification group, the certification will not be accepted.

Figure 15:
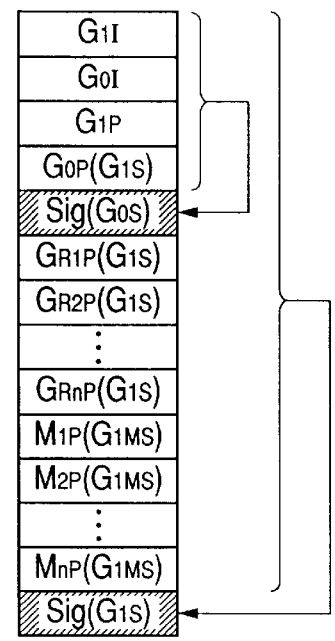
FIG. 15 is an explanatory view showing the structure of data for a non-certification group.

FIG. 15 shows an example of the structure of a group certificate $G_{1C}$ corresponding thereto.

(16) Authorization of Immediately Above Group

Until now, if the public key of a certain group is known, it has been possible to know the public key of its direct or indirect member. Thus, in case where a higher level group is formed, when the public key of the group is changed, the user individually must take an action to "know the public key of a reference group". Also, for the method to "know the public key of a reference group", other appropriate methods should be determined, but there are often present security holes with the methods.

When a group $G_n$ is going to certify an individual or a group as a member, the member (individual or group) $M_i$ to be certified will be imposed to authorize $G_n$ conversely. By doing so, each member $M_i$ is capable of knowing the legitimacy of the group $G_n$ which authorized the person himself, and is also capable of knowing the public key $G_{nP}$ of $G_n$. Similarly, the group $G_n$ is capable of knowing the public key $G_{n-1P}$ of the immediately above group $G_{n-1}$. In this way, the public key $G_{OP}$ of the highest level group $G_0$ can be reflexively known.

As the concrete method, there are conceivable the following several methods by the group responsible person, similar to the identification of the person himself of a member. In any case, if the immediately above group is authorized, there can be adopted such a method as to indicate its authorization by placing the electronic signature of its own on the group certificate (or information on the interior of the service corresponding thereto) of the immediately above group.

Method

Near a point of time (before, after or at the same time) whereat the manager $G_{nR}$ of the group $G_n$ authorizes the member Hi as a member, the group manager $G_{nR}$ notifies the member $M_i$ of authorization as a member, and the specifying information $G_{nI}$ of the group orally or by a method of telephone or the like. Since the member $M_i$ is personally acquainted with the group manager $G_{nR}$, the member $M_i$ can recognize that it is certainly information from $G_{nR}$. The member $M_i$ electronically signs the group certificate $G_{nC}$. As regards an actual operation of the member $M_i$, the client system recognizes the request for authorization, and displays the specifying information $G_{nI}$ of the group $G_n$, inquiring whether or not the member $M_i$ recognizes. When answering that it is determined, the client system will electronically sign the group certificate $G_{nC}$. Such a method can be also adopted.

(17) Omission of Immediately Above Group's Authorization

When becoming a member of a group, whose public key is known directly or indirectly, the authorization to the group is omitted.

(18) Restriction to Same Group Hierarchy

When there exists already a group hierarchy, whose public key a certain individual knows directly or indirectly, the authorization of groups which do not belong to the group hierarchy is rejected. This prevents belonging to an illegitimate group hierarchy.

For example, in case where a group hierarchy is illegitimately formed in imitation of an actual group hierarchy and it is requested to become one group forming the illegitimate group hierarchy, if it has structure having a close imitation of the actual group hierarchy, there is a possibility that the individual cannot see through any illegitimacy but authorizes becoming a member. If he authorizes it and sends information, to which he can refer, to an legitimately-pretended illegitimate group or individual belonging to the illegitimate group hierarchy, the information will be stolen. The provision of a rejection rule shown here enables the risk to be eliminated.

Processing in Certification Mechanism

Figure 16:
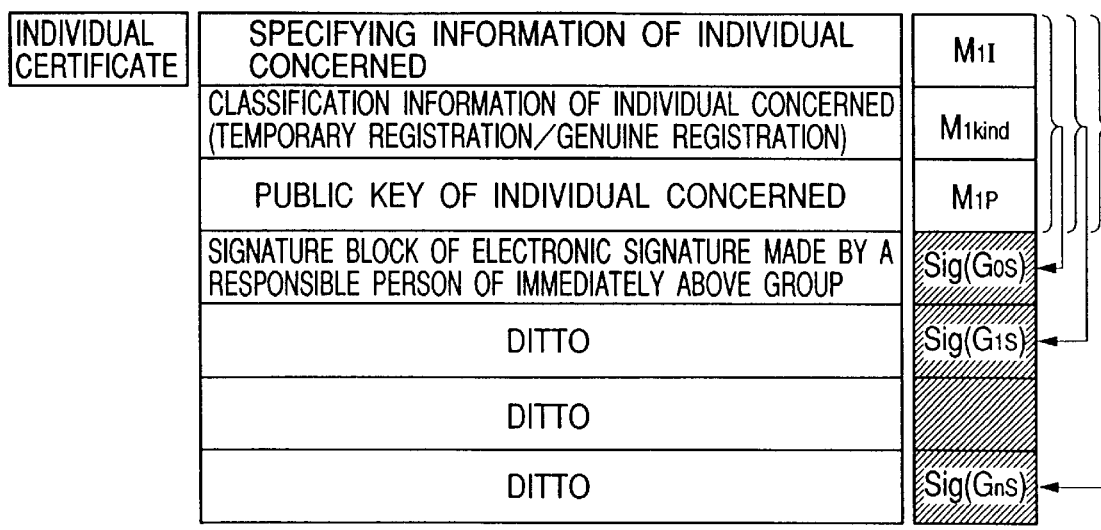
FIG. 16 is an explanatory view showing a concrete example of an individual certificate.

Next, the description will be made of concrete processing of the certification mechanism. In this respect, since the individual concrete processing can be easily understood from the drawings, the detailed description will be omitted. In the following description, the individual certificate shown in FIG. 16 and the group certificate shown in FIG. 17 will be used. Also, the server 100 also holds the same information.

Figure 18:
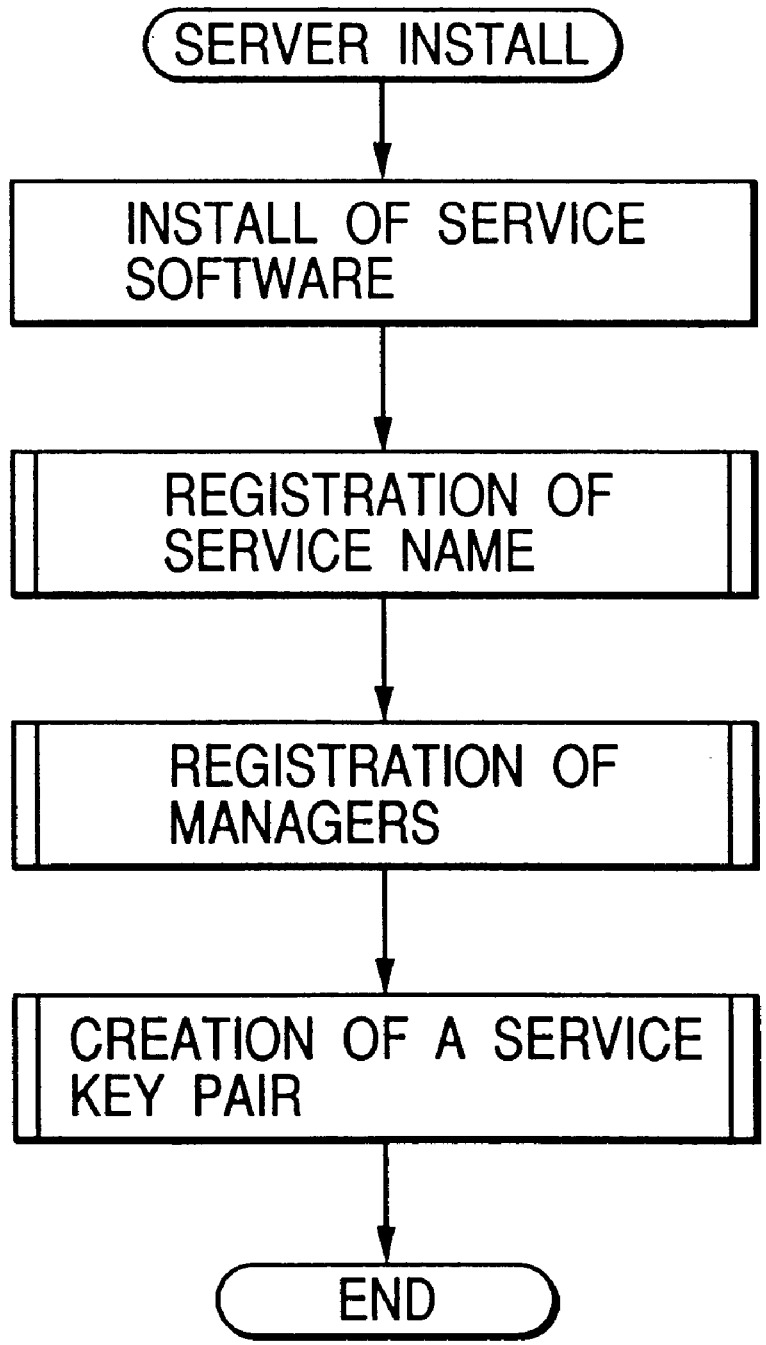
FIG. 18 is a flow-chart for explaining an operation of installing certification service of an embodiment in a server.

(1) Server Install (FIG. 18)

This process installs software for certification for further initializing. In the server 100, the server manager installs. As regards registration of a service name, registration of a manager, and preparation of a service key pair, the description will be made in FIGS. 19, 20 and 21 respectively.

Figure 19:
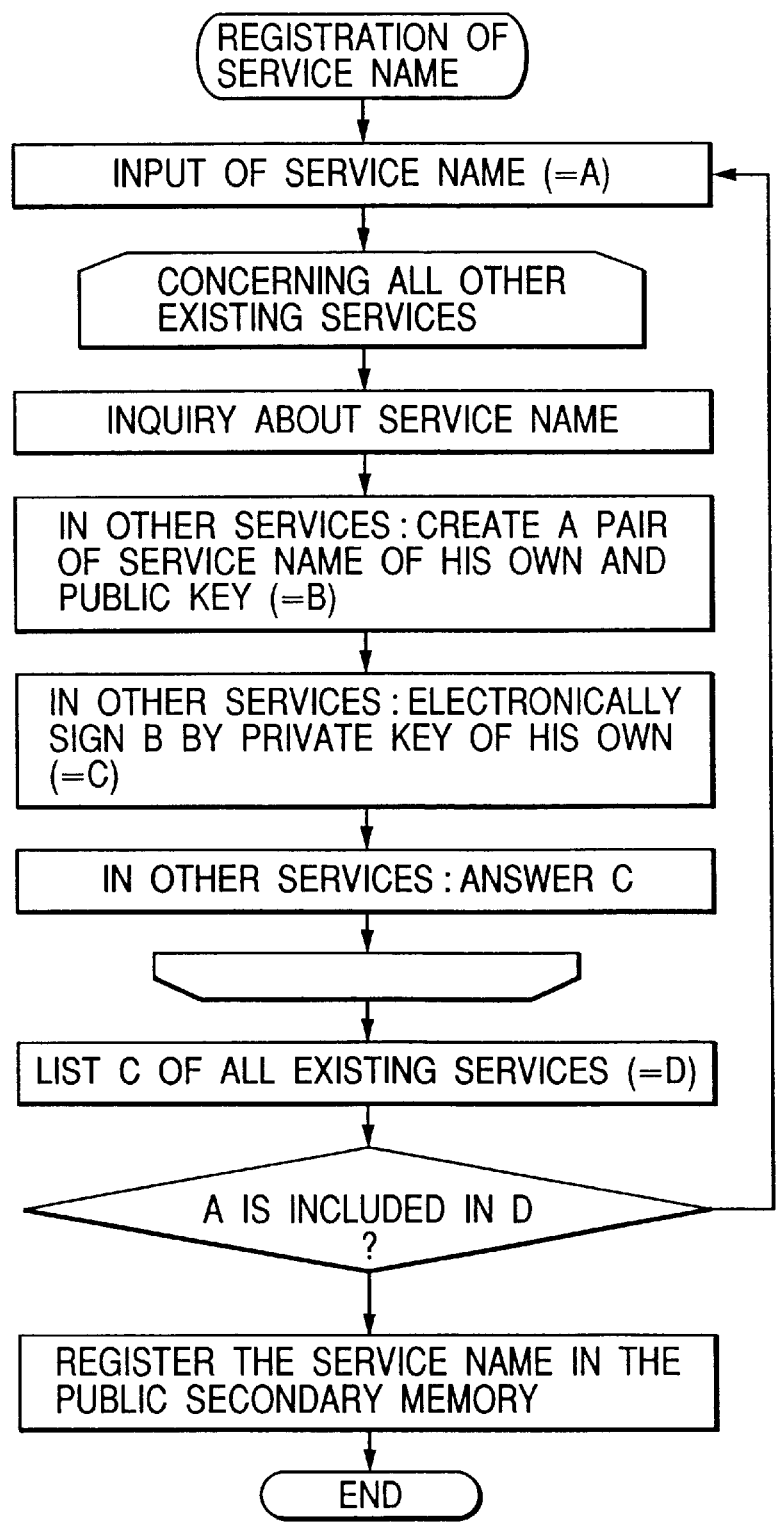
FIG. 19 is a flow-chart for explaining a registration operation of a service name.

(2) Registration of Service Name (FIG. 19)

Registration of a service name is called from the server install (FIG. 18). The service name is registered so as not to overlap other service names. The other service notifies the service name registration process of the service name in such a mode that security has been obtained by electronic signature, and is adapted to prompt re-input if the service name is overlapped. The service name is registered in the public secondary memory 102 in the server 100.

Figure 20:
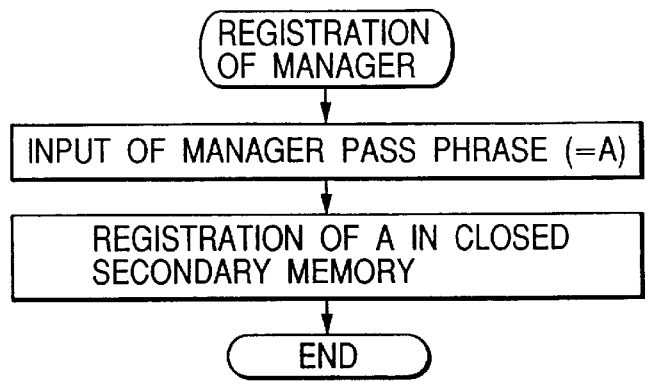
FIG. 20 is a flow-chart for explaining a registration operation for a manager.

(3) Registration of Manager (FIG. 20)

Registration of a manager is also called from the server install (FIG. 18). This process is to register the pass phrase of the manager with the closed secondary memory 101 in the server 100.

Figure 21:
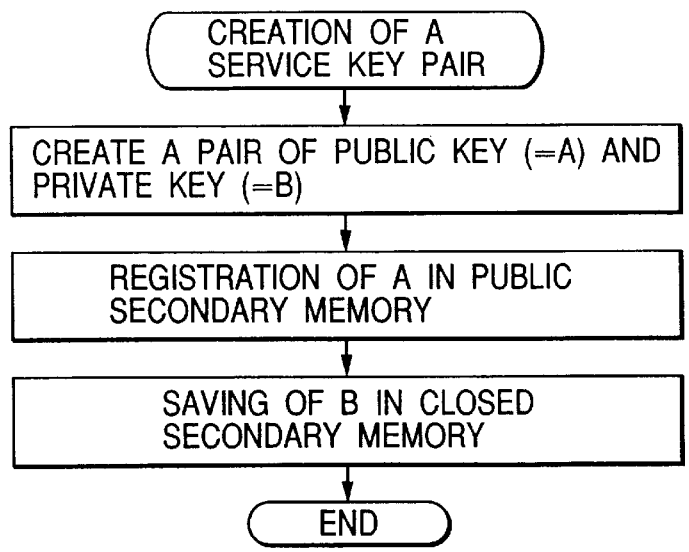
FIG. 21 is a flow-chart for explaining a preparation operation for a service key pair.

(4) Preparation of Service Key Pair (FIG. 21)

Preparation of a service key pair is also called from the server install (FIG. 18). The service public key is registered in the public secondary memory 102 in the server 100, and the service private key is registered in the closed secondary memory 101 in the server 100.

Figure 22:
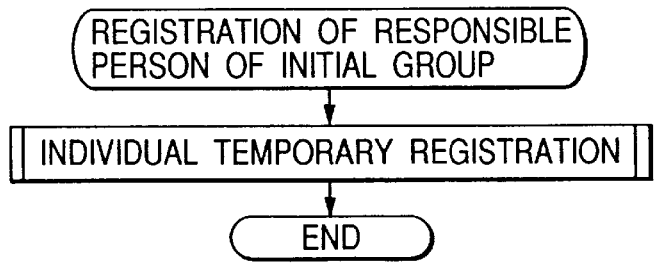
FIG. 22 is a flow-chart for explaining a registration operation for an initial group responsible person.

(5) Registration of Initial Group Responsible Person (FIG. 22)

The initial group responsible person is registered by the initial group responsible person from the client 200 of his own. This processing is actually the same as the following individual registration.

Figure 23:
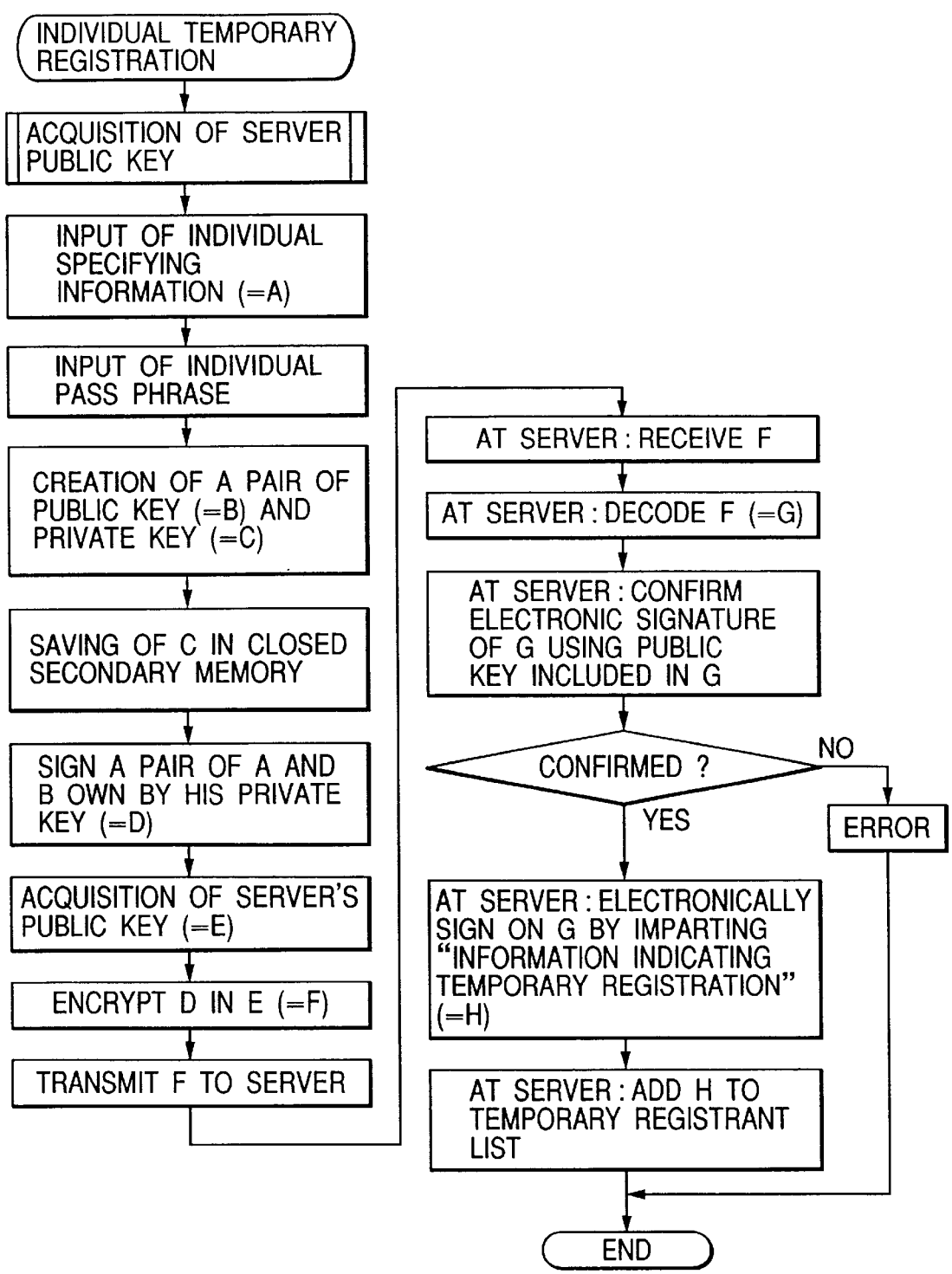
FIG. 23 is a flow-chart for explaining an individual temporary registration operation.

(6) Individual Temporary Registration (FIG. 23)

This processing is performed by each individual from the client 200 of each person. The individual temporary registration is to store a pair of the individual specifying information and the public key (contents of registration) electronically signed by the individual private key in a temporary registrant list (public secondary memory 102 in the server 100). The contents of target registration are safely sent to the server 100 using the public key of the server 100. The process of the server 100 is to confirm the legitimacy of the electronic signature by the individual private key for registration. As regards acquisition of the server public key, the description will be made below.

Figure 24:
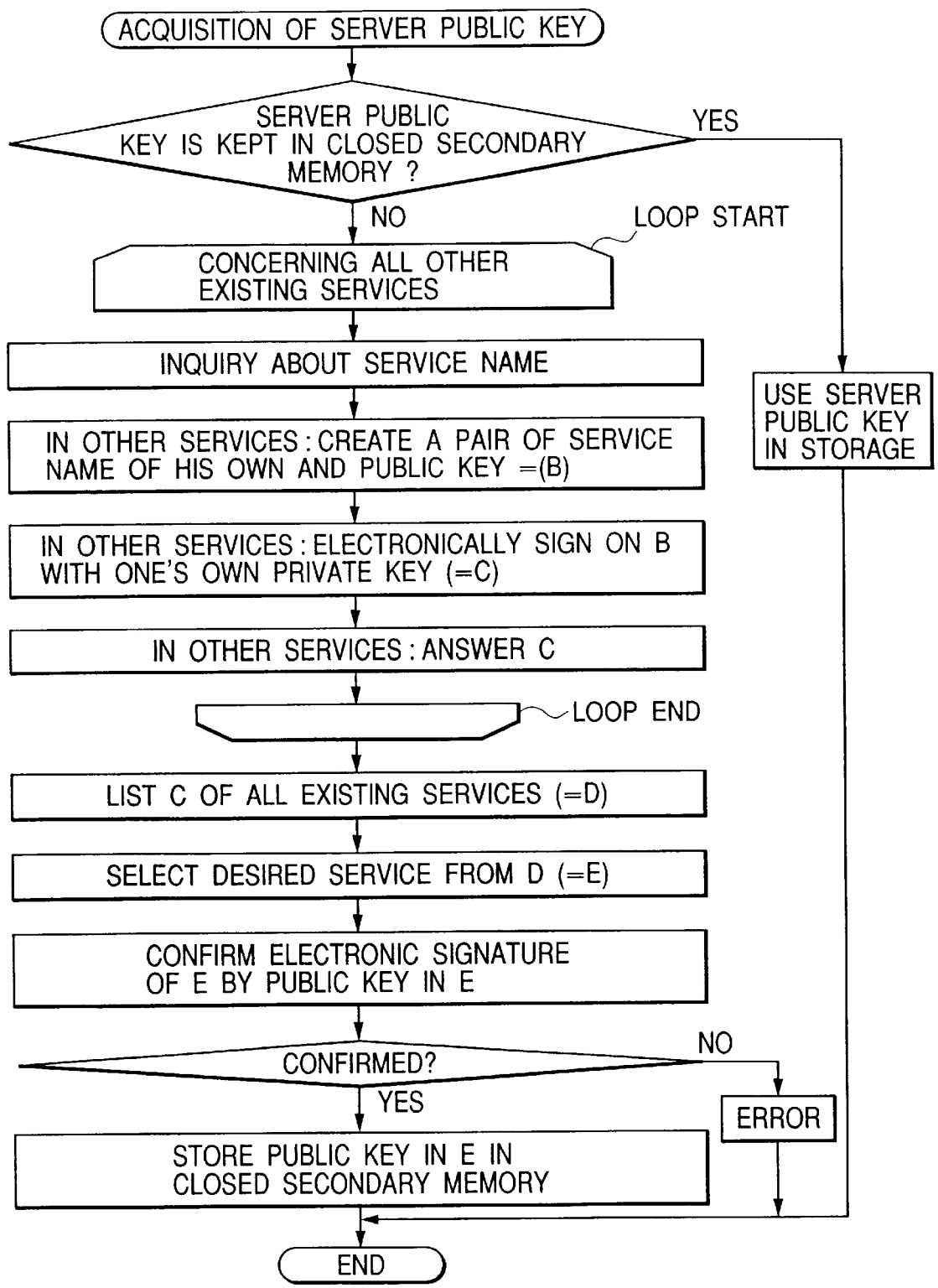
FIG. 24 is a flow-chart for explaining a server public key acquisition operation.

(7) Acquisition of Server Public Key (FIG. 24)

An acquisition process of the server public key is called from the individual temporary registration (FIG. 23). In a case where the client 200 has the server public key in the closed secondary memory 201, it is used. Otherwise, the client 200 refers to other services and thereafter, acquires the server public key to hold it in the closed secondary memory 201.

In this respect, "loop start" and "loop end" in FIG. 24 represent a start and an end of the loop respectively.

Therefore, the processes interposed between the loop start and the loop end are repeated in a number of times of all other existing services.

Since the symbol of the loop end represents only the termination of the loop, the interior of the symbol is blank.

Figure 32A:
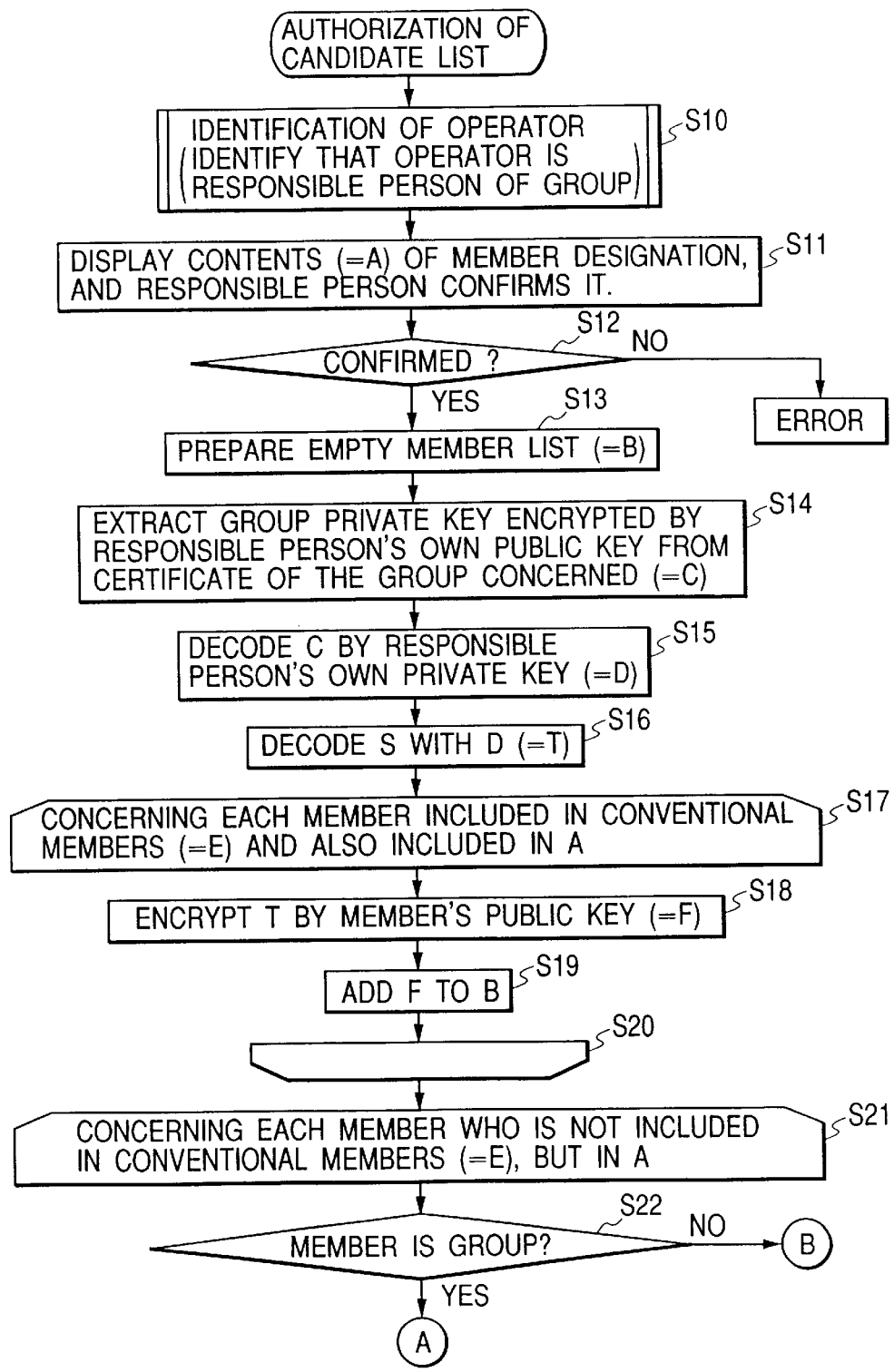
FIGS. 32A–32C are flow-charts for explaining an operation of authorizing a candidate list.
Figure 32B:
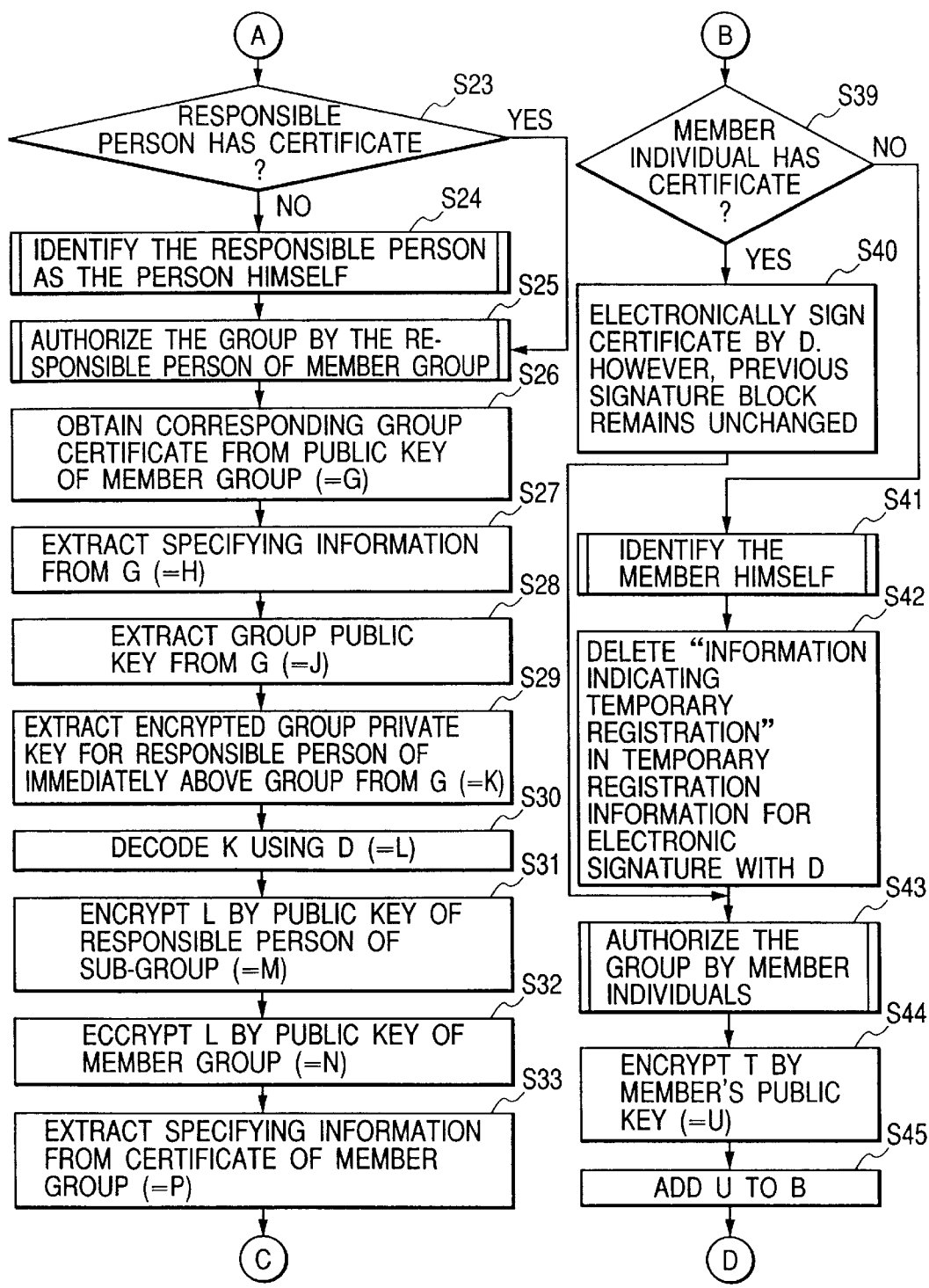
Figure 32C:
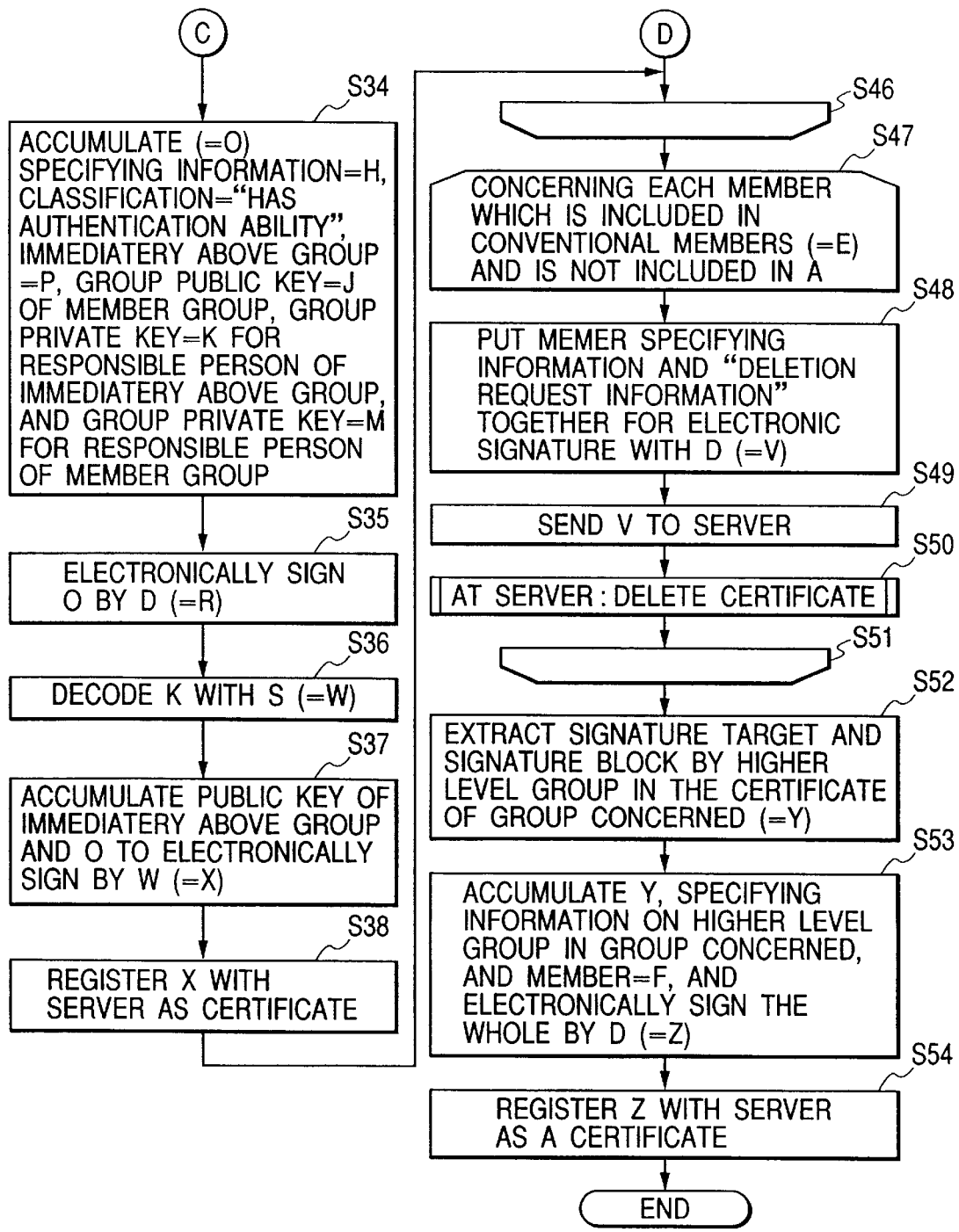

Further, the symbol of loop is likewise used also in other figures (FIGS. 19, 32 and 35).

Figure 25:
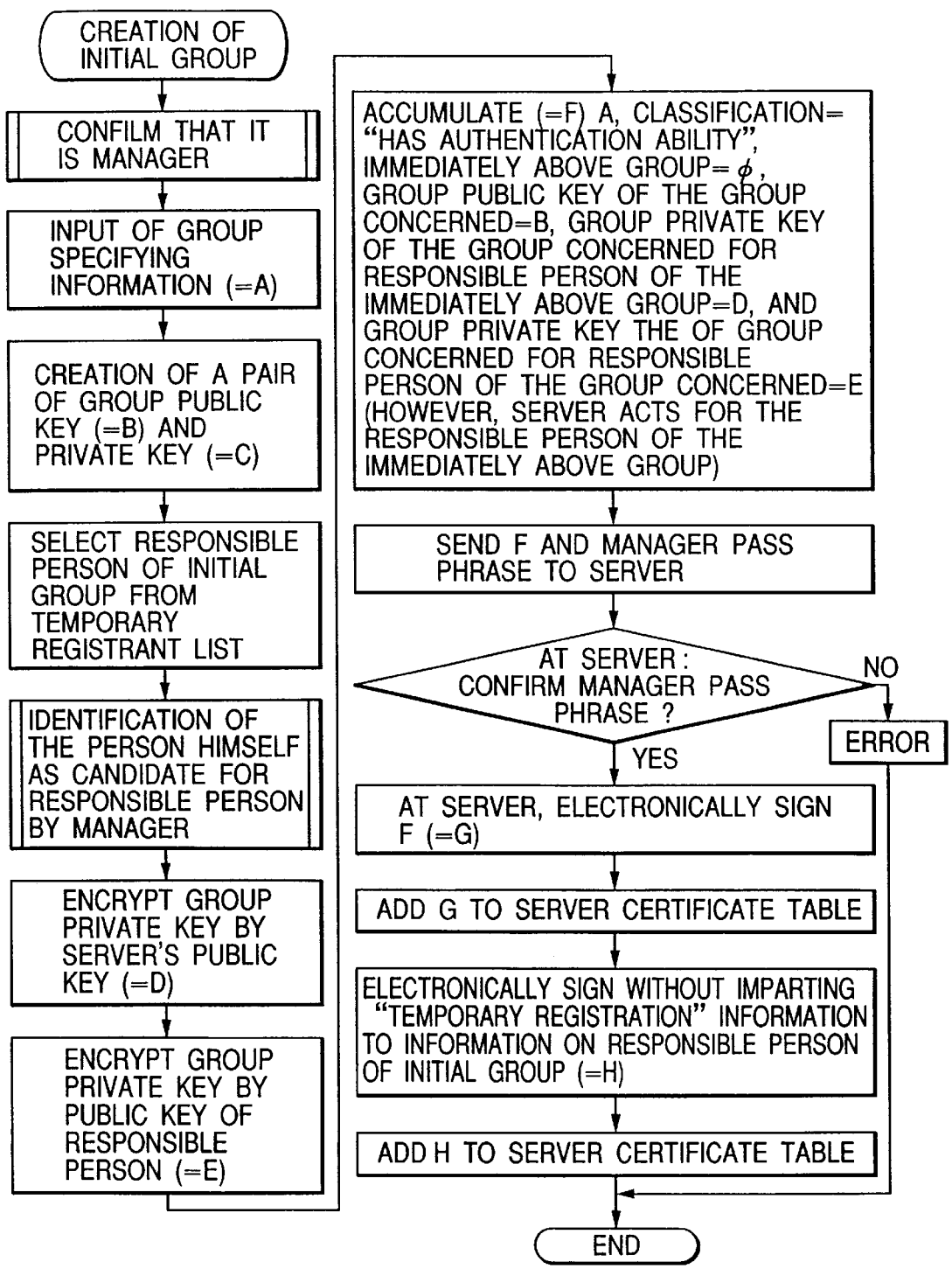
FIG. 25 is a flow-chart for explaining an initial group creation operation.

(8) Creation of initial group (FIG. 25)

In this example, the manager creates an initial group in an arbitrary client 200 or the server. Of course, the group responsible person himself may individually create it. First, it is confirmed that it is the manager. For this, please see FIG. 26. The manager performs 1) input of group specifying information, 2) creation of the group public key and private key, 3) identification of the person himself of a candidate for the group responsible person, 4) creation of certificate data and the like to send the data for certification to the server 100 together with the manager pass phrase. The server 100 confirms the manager pass word (FIG. 26), and signs the data for certification and the responsible person information to register in the certificate list (public secondary memory 102).

Figure 26:
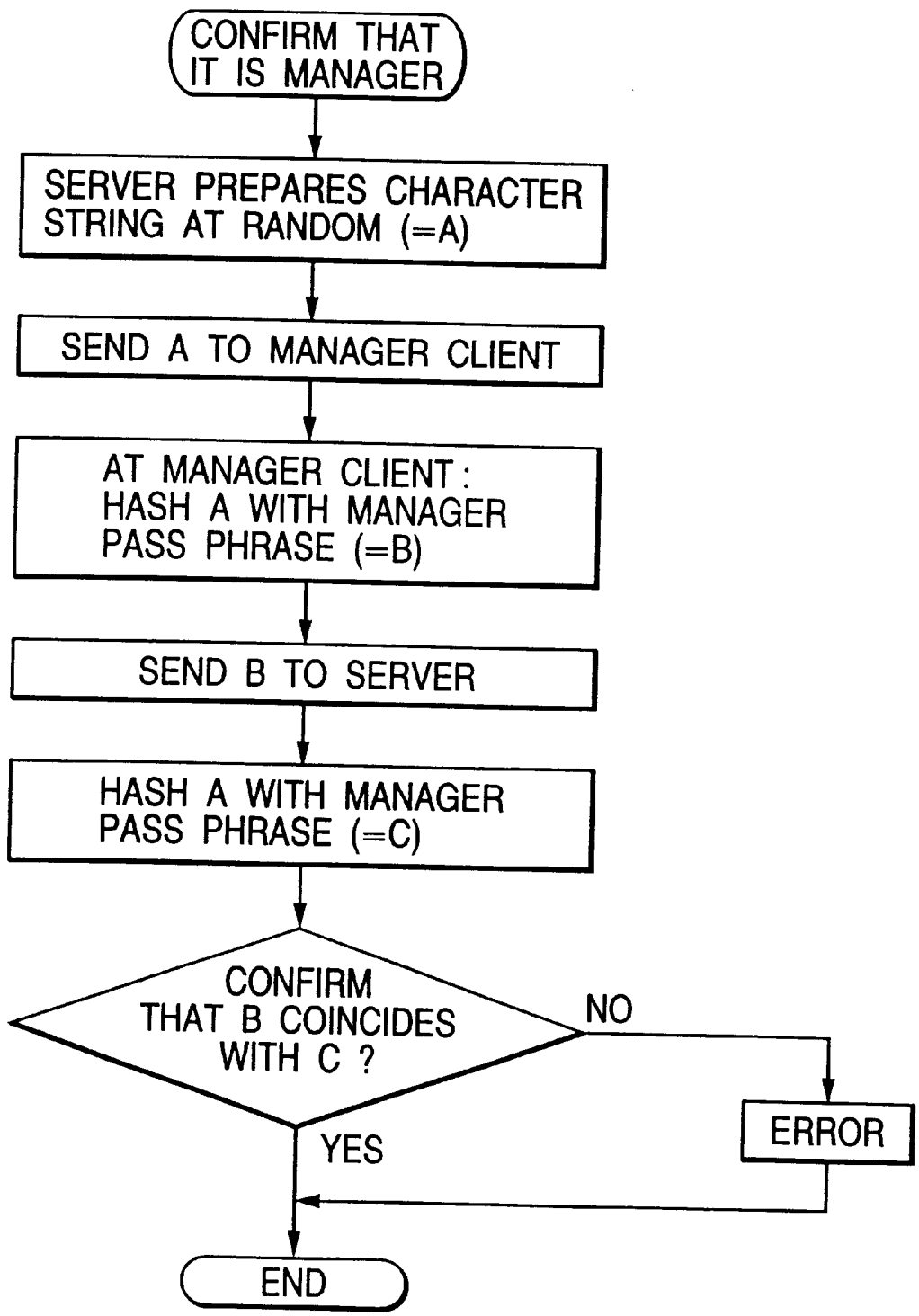
FIG. 26 is a flow-chart for explaining a manager identifying operation.

(9) Identification that it is the Manager (FIG. 26)

The identification of the manager is called from the creation process of an initial group (FIG. 25). The manager is identified by, for example, a challenge and response technique. The server 100 creates character strings at random to send to the manager client 200. The manager client 200 hashes the character strings using the manager pass phrase to return the arithmetic result to the server 100. The server 100 performs a similar calculation, checks it against the arithmetic result sent from the manager, and if they coincide with each other, identifies that it is the manager.

Figure 27:
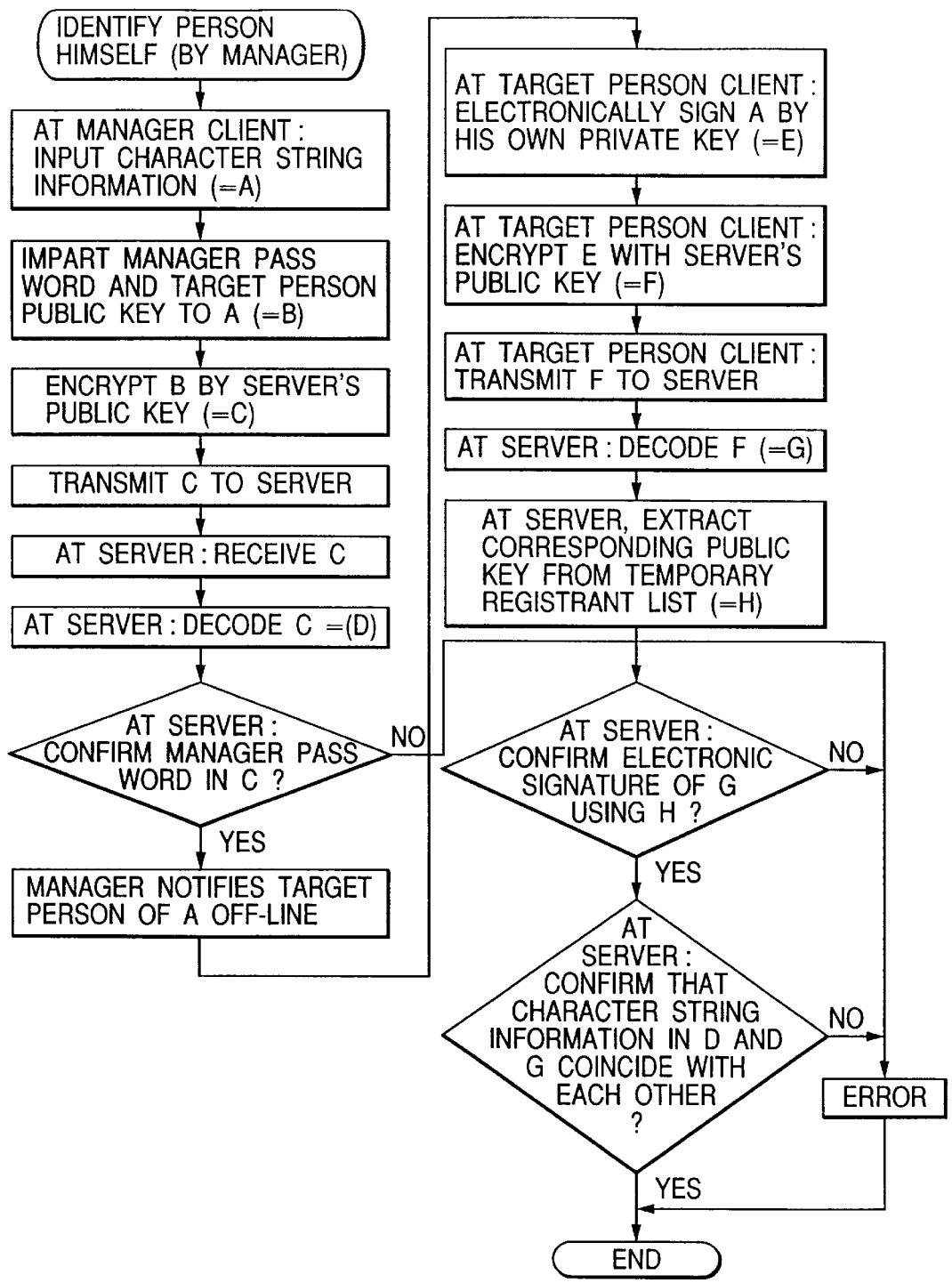
FIG. 27 is a flow-chart for explaining an operation of identifying the person himself by a manager.
Figure 28:
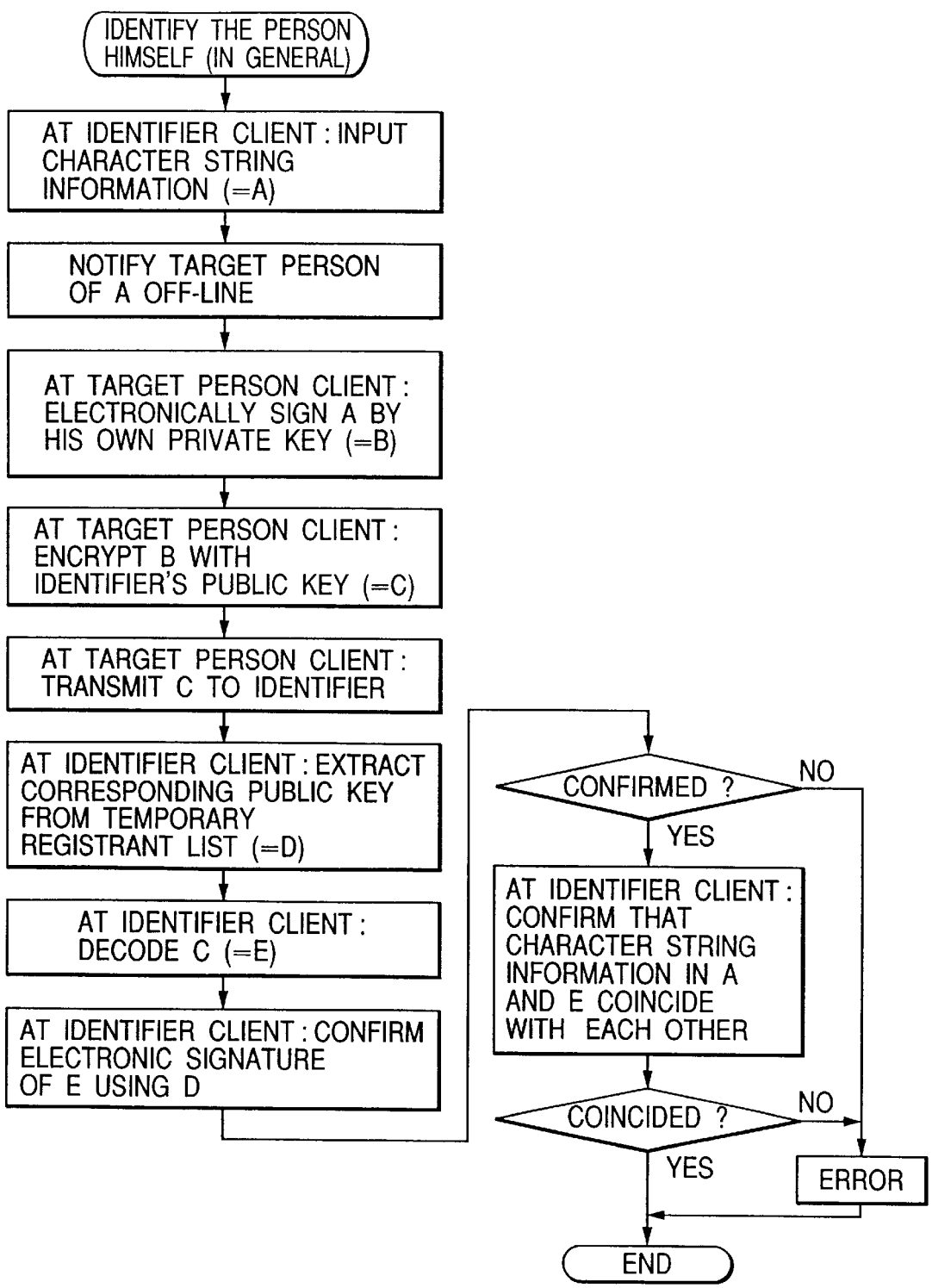
FIG. 28 is a flow-chart for explaining an operation of identifying the person himself by a user.

(10) Identification of the Person Himself (By Manager) (FIG. 27)

The identification of the person himself for a candidate for the responsible person by the manager is called from the creation process of an initial group (FIG. 25). In order for the manager to perform the identification of the person himself, information (character string information) for identification of the person himself is sent from the manager client 200 to the server 100, and the manager notifies the target candidate for the responsible person of the character string information for identification of the person himself offline. The candidate for the responsible person electronically signs the character string information concerned by the private key of his own in the client 200 to send it to the server 100. In this respect, security is ensured by the server public key between the client servers. The server 100 confirms the electronic signature using the public key of the responsible person candidate, and further confirms the coincidence of the character string information to identify the person himself.

(11) Identification of the Person Himself (in general)

Generally, the identification of the person himself is a process of identifying a temporarily-registered individual as the person himself by any other than the manager. An identifier (group responsible person) performs in the client 200 of his own. The identifier inputs character string information for identification to the client 200, and sends to the target person offline. The target person electronically signs the character string information by the private key of his own in order to indicate his confirmation, and sends it to the client 200 of the identifier. In information transmission between identifier and target person, a cryptogram based on the identifier's public key is used. The identifier identifies the electronic signature of the information sent from the target person by the target person's public key, further checks both character string information, and if they coincide with each other, the identification of the person himself is successfully terminated.

Figure 29:
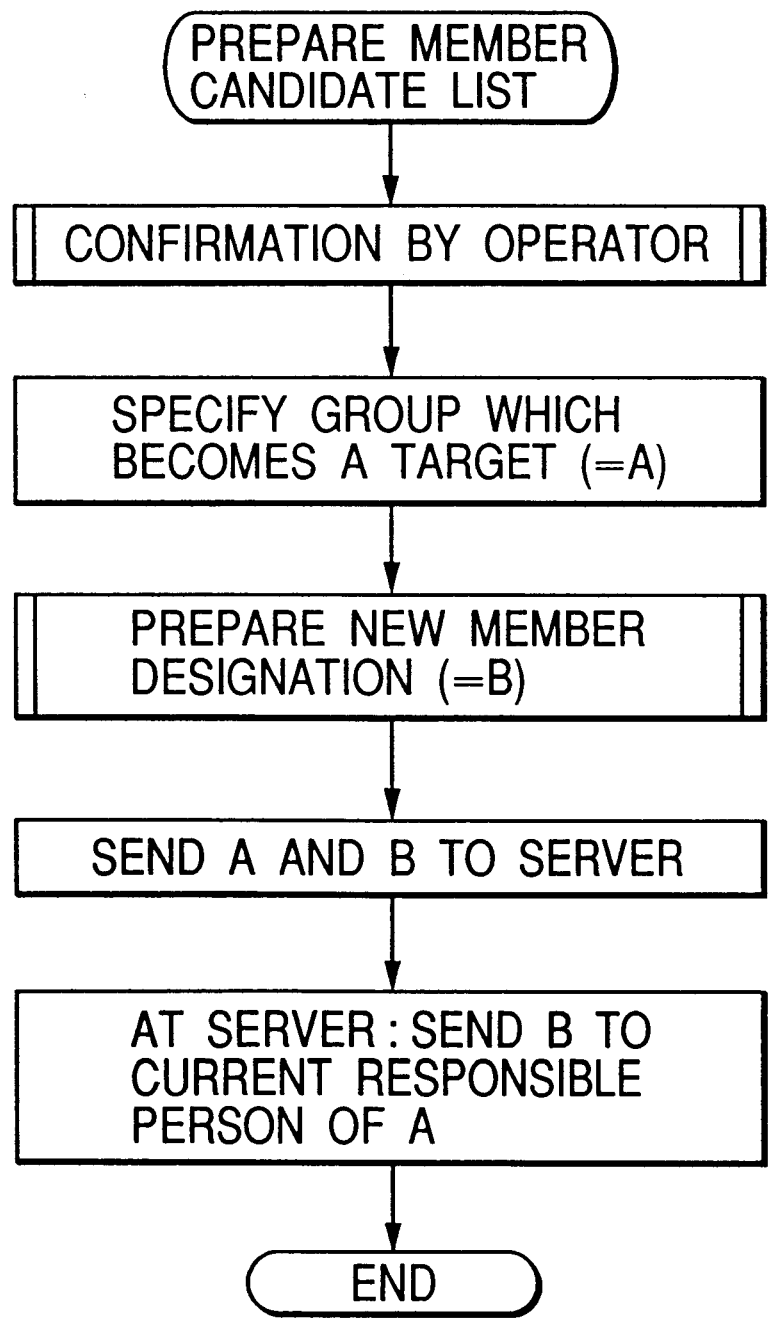
FIG. 29 is a flow-chart for explaining an operation of preparing a member candidate list.

(12) Preparation of Member Candidate List (FIG. 29)

Preparation of a member candidate list is a process of temporarily designating, when there is an existing group, a member of the group, and an arbitrary individual (who may be the responsible person himself) performs at the client 200 by himself. A member candidate list prepared is sent to the group responsible person, who authorizes or rejects it (FIG. 32). In this process, there are performed 1) identification of an operator (FIG. 30), specifying the group and designation of a new member (FIG. 31), 2) sending information on the member candidate list to the server 100, and 3) sending the member candidate list to the target group responsible person by the server 100.

Figure 30:
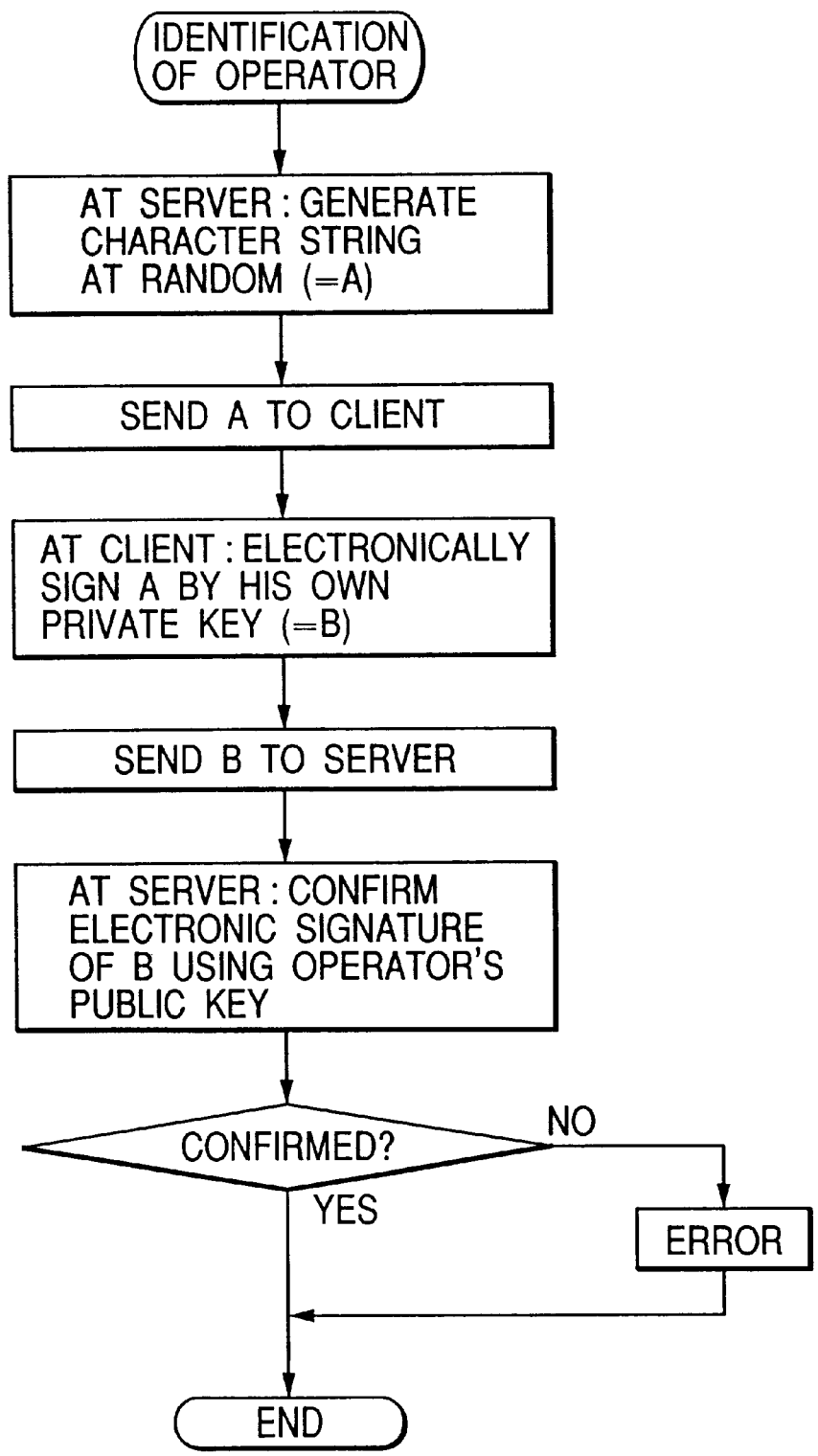
FIG. 30 is a flow-chart for explaining an operation of identifying an operator.

(13) Identification of Operator (FIG. 30)

This process is called from the preparation of the member candidate list. In order to perform this process, the information sent from the server 100 is electronically signed by the operator's private key at the operator client 200, and this is identified by the server 100. The information from the server 100 is character strings generated at random to avoid attack.

Figure 31:
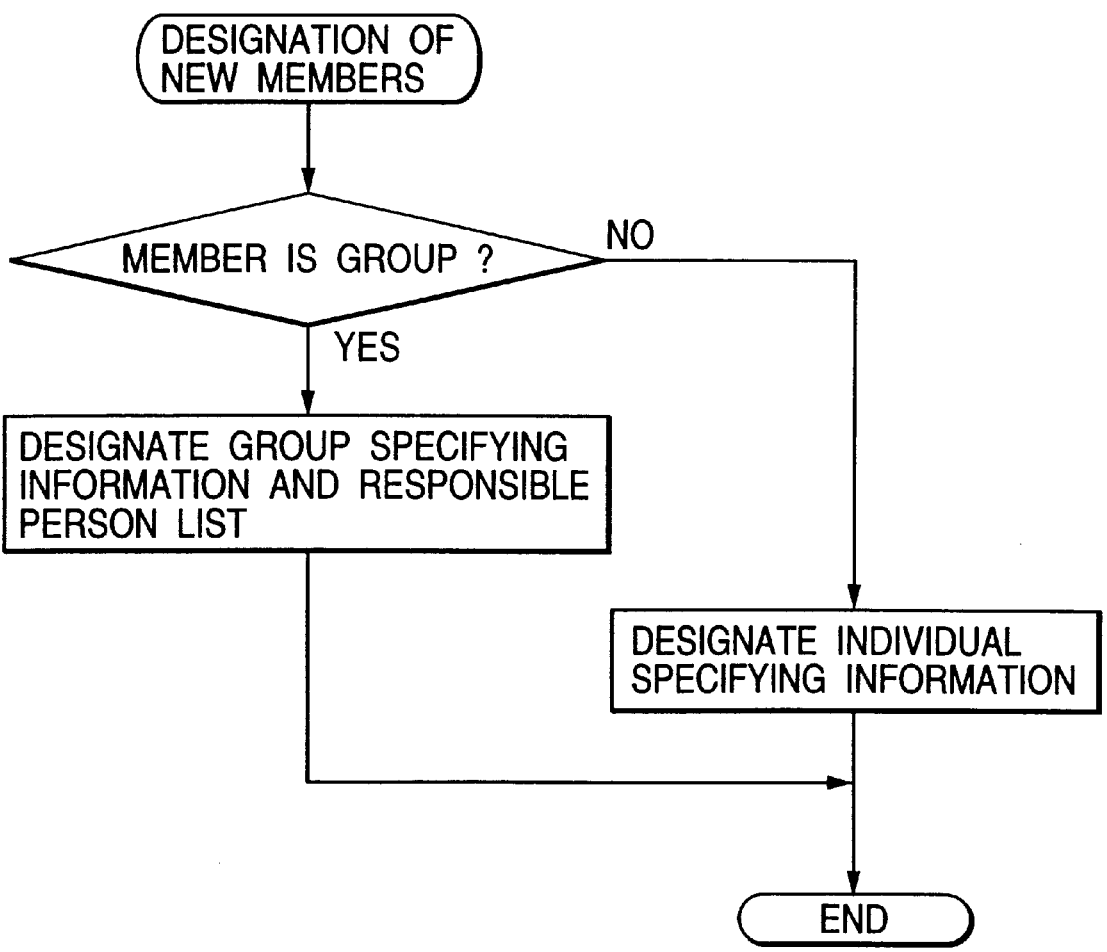
FIG. 31 is a flow-chart for explaining an operation of designating a new member.

(14) Identification of New Member (FIG. 31)

This process is also called from the preparation of the member candidate list. The process differs depending upon whether the member candidate is an individual or a group.

(15) Authorization of Candidate List (FIG. 32)

On receipt of a member candidate list from the server, the group responsible person authorizes the candidate list. Concerning this process, since the flow becomes complicated, the description will be made with reference to the figures. This process is roughly as follows:

1) Identification of Operator (S10)

This is the same process as in FIG. 30. The identification is performed by using the operator's electronic signature. This identification also confirms that the operator is the responsible person of the group concerned at the same time.

2) Confirmation of Member Designation (S11, S12)

The group responsible person confirms group designation displayed, and after the confirmation, the process proceeds to the next step. Otherwise, it is made to be an error.

3) Preparation to Prepare New Group Certificate (S13 to S16)

The member list is made empty, and the group member private key is restored to its original state. More specifically, the group private key ($G_{1S}$, D) is decoded, and $G_{1S}$ ($G_{1MS}$) (inscribed as S in the figure) is decoded by the group private key decoded to obtain the group member private key ($G_{1MS}$, T).

4) Process for Target included, as Member, in New Group as well as Conventional Group (S17 to S20)

The group member private key ($G_{1MS}$, T) is encrypted by the member public key. In this respect, the loop process including FIG. 32 is represented by interposing between a rectangle having broken-off right and left corners on the upper side (for example, S17) and a rectangle having broken-off right and left corners on the lower side (for example, S20).

5) Process for Target included in New Group although not included in Conventional Group (S21 to S46)

In a case where the member is an individual, Steps S39 to S45 will be performed. If the individual member has already had a certificate, the certificate will be electronically signed by the responsible person's group private key $G_{1S}$ (D) (the responsible person identifies the individual concerned to be a member of the group, S40). Thereafter, the member individual authorizes the group (see S43, FIG. 33). After authorized by the responsible person and the individual in this manner, the group member private key $G_{1MS}$ (T) is encrypted by the member public key to be added to the list (S44 and S45). In a case where the individual member has no certificate, the member is identified as the person himself (S41) and a pair of the public key and the specifying information is electronically signed by the responsible person's group private key (S42). Thereafter, the process will be executed in the same manner as the case where he has already had the certificate (S43 to S45).

In a case where the member is a group, Steps S23 to S38 will be performed. In this case, since the immediately above group of the target group is changed (may be added), the certificate for the target group is changed to be registered in the server 100. In a case where the responsible person of the target group has a certificate, the group is certified directly by the responsible person of the target group (S25, FIG. 33). In a case where the responsible person of the target group has no certificate, the responsible person of the target group concerned is first identified as the person himself (S24).

Thereafter, of the information on the group certificate of the target group, the information and signature of the immediately above group are changed (S26 to S35), and further, the entire contents of the certificate are signed by using the group private key of the target group to be registered in the server 100 as a new certificate (S36 to S38).

6) Process for Target not included in New Group although included in Conventional Group (S47 to S51)

The specifying information of such a member and a request ("deletion request information") to delete this are coupled, and are signed by the group private key to be sent to the server 100. In response thereto, the server 100 deletes the old member (S50, FIG. 34).

7) Structure of Certificate (S52 to S54)

As described above, a certificate, in which the member has been changed, is prepared to be registered in the server 100.

Figure 33:
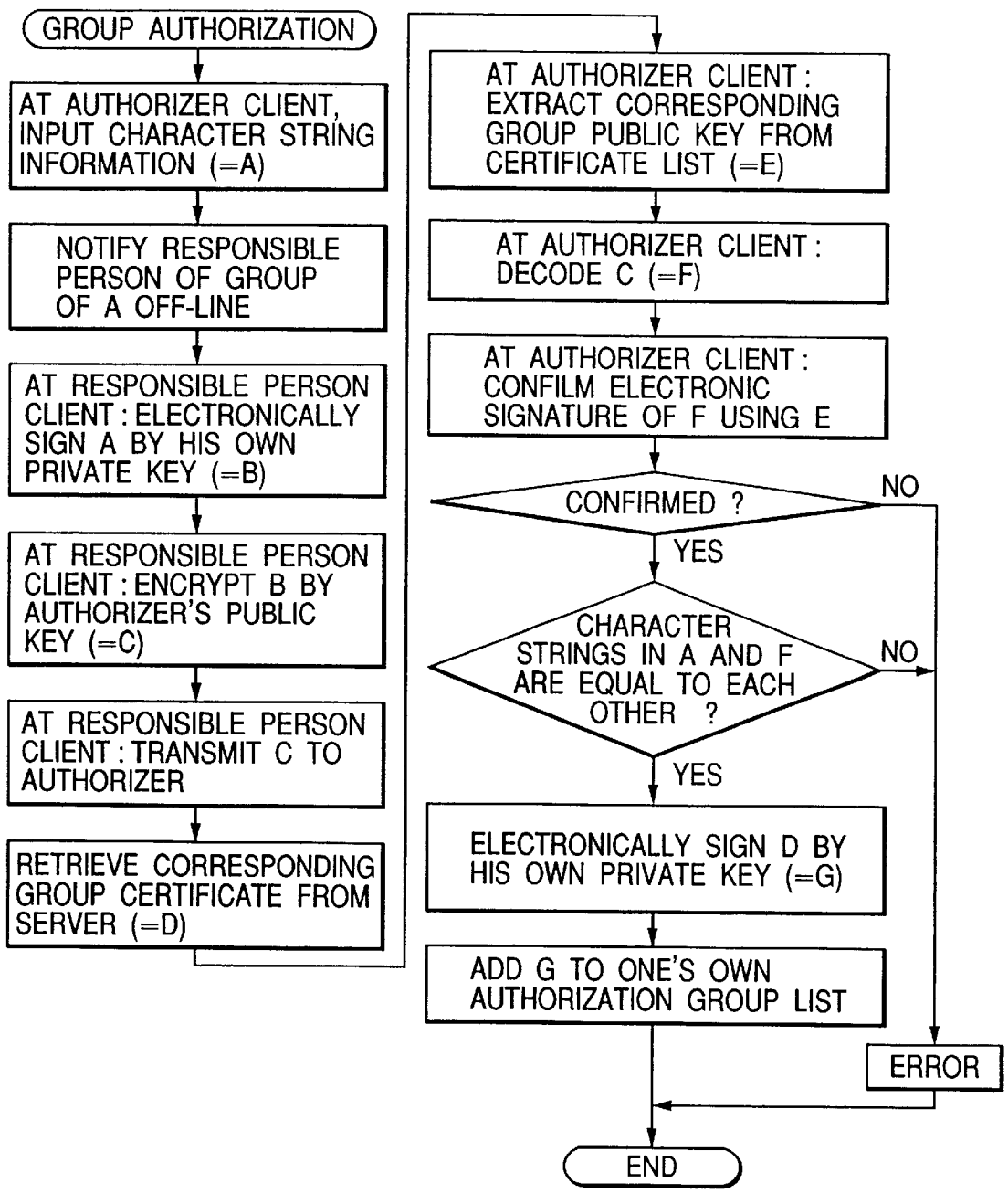
FIG. 33 is a flow-chart for explaining an operation of authorizing a group.

(16) Group Authorization (FIG. 33)

Group authorization is a process of authorizing a group from the member side on becoming a member of the group, and is called from the authorization (FIG. 32) of a candidate list.

Figure 34:
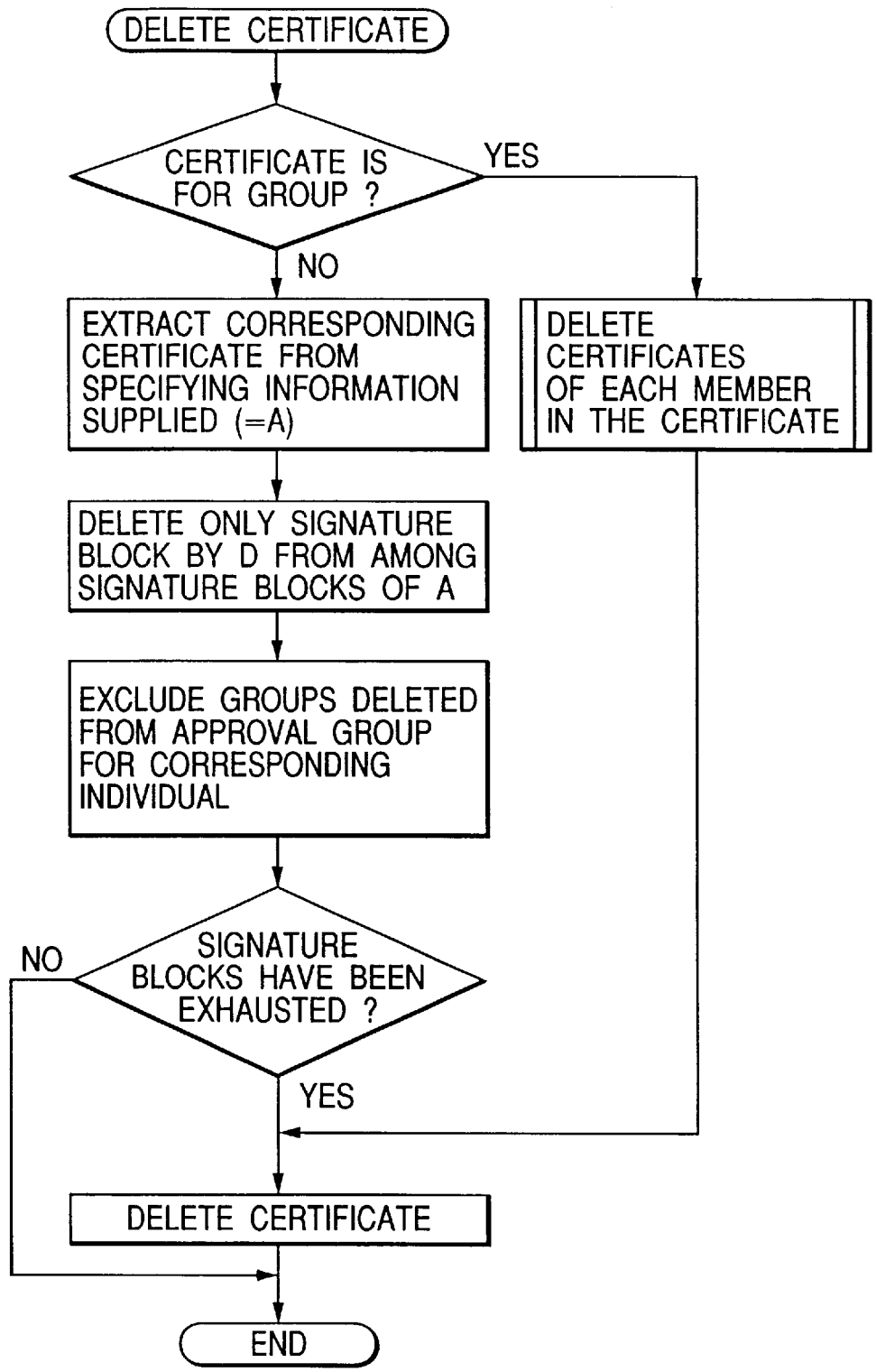
FIG. 34 is a flow-chart for explaining an operation of deleting a certificate.

(17) Deletion of Certificate (FIG. 34)

Deletion of a certificate is a process of deleting a certificate which has become invalid when the member of the group is changed and has ceased to be the member, and is called from the authorization (FIG. 32) of a candidate list.

(18) Confirmation of Certificate (FIG. 35)

Confirmation of a certificate is a process of confirming the correspondence relation between a group or an individual indicated by the specifying information and its public key by confirming a chain of signatures for a group certificate and an individual certificate, which are the original purposes of the Certification Authority, and a process of putting encipherment of information, confirmation of electronic signatures and the like into practice by an arbitrary individual, who must confirm the legitimacy of the public key, in the client of his own.

Effect of the Invention

As described above, according to the present invention, certification is dispersedly performed with the responsible person of a group as the center within an organization such as an enterprise, and therefore, the certification can be performed uniformly and fairly without necessitating the existence of any fair third party, and a group such as a department and a section can be easily handled.

What is claimed is:

1. A certification apparatus for performing a certification for an individual and a group in an organization constructed by hierarchically arranging a group having at least one of an individual and a group as a constituent member, comprising:
   a confirmation process unit that confirms a certification target on the basis of communication between a responsible person of a group and said certification target belonging to said group; and
   a certificate generating unit that generates a certificate for said certification target by signing signature-target information including a public key for said certification target and specifying information on said certification target by a private key used by the responsible person of said group.

2. The certification apparatus according to claim 1, further comprising a unit that stores said certificate generated.

3. The certification apparatus according to claim 1, wherein said signature-target information further includes the specifying information on said group.

4. The certification apparatus according to claim 1, wherein a certificate having a group as a certification target further includes specifying information on respective members of said group, and signature information comprising said specifying information signed by a private key of the responsible person of said group.

5. The certification apparatus according to claim 1, wherein a certificate having a group as a certification target further includes a shared private key for members of said group encrypted by respective public keys of members of said group; a shared public key for members of said group; and signature information comprising at least said members' shared private key encrypted, signed by the private key of the responsible person of said group.

6. The certification apparatus according to claim 1, wherein a private key used by the responsible person of said group encrypted by a public key corresponding to a private key used by a responsible person of a group in a higher level hierarchy of said group is further included in said certificate.

7. The certification apparatus according to claim 6, wherein the private key used by the responsible person of said group is set independently of an individual private key of said responsible person, and the private key used by the responsible person of said group encrypted by the individual public key of the responsible person of said group is included in said certificate.

8. The certification apparatus according to claim 1, further comprising, on generating said certificate, a confirming unit of said group using said certification target based on the communication between the responsible person of said group and said certification target belonging to said group.

9. The certification apparatus according to claim 1, wherein said signature-target information includes information having classification of said signature target described therein.

10. The certification apparatus according to claim 9, wherein the classification of said signature target includes also classification for which certification by a certificate for the corresponding certification target has no effect.

11. The certification apparatus according to claim 1, wherein along with communication between the responsible person of said group and a certification target belonging to said group, the certification target belonging to said group receives the specifying information on said group and a private key for said group and signs by a private key of said certification target itself.

12. The certification method for performing certification for an individual and a group in an organization constructed by hierarchically arranging a group having at least one of an individual and a group as a constituent member, comprising the steps of:
   performing a confirmation process for said certification target on the basis of communication between a responsible person of a group and a certification target belonging to said group or the responsible person of said certification target; and
   generating a certificate for said certification target by signing information including a public key for said certification target and specifying information on said certification target by a private key of the responsible person of said group.

13. The certification method according to claim 12, further comprising a step of keeping said certificate generated.

14. A computer programmed product for certification used for performing certification for an individual and a group in an organization constructed by hierarchically arranging a group having at least one of an individual and a group as a constituent member, said computer programmed product being used in order to cause a computer system to execute the following steps of:
   performing a confirmation process for said certification target on the basis of communication between a responsible person of a group and the certification target belonging to said group or the responsible person of said certification target; and
   generating a certificate for said certification target by signing information including a public key for said certification target and specifying information on said certification target by a private key of the responsible person of said group.

15. The computer programmed product for certification according to claim 14, wherein said computer programmed product is used in order to further execute a step of keeping said certificate generated.

16. A certificate recording medium for storing a certificate for performing certification for an individual and a group in an organization constructed by hierarchically arranging a group having at least one of an individual and a group as a constituent member, said certificate being generated by signing signature-target information including a public key for a certification target and specifying information on said certification target by a private key used by the responsible person of a group directly including said certification target.

17. A client server system for certification, for performing certification for an individual and a group in an organization constructed by hierarchically arranging a group having at least one of an individual and a group as a constituent member, comprising:
   a server for keeping a certificate generated by signing signature-target information including a public key for the certification target and specifying information on said certification target by a private key used by the responsible person of a group directly including said certification target; and a client for using a public key included in said certificate by retrieving a predetermined certificate from said server.

18. The client server system for a certification according to claim 17, wherein said client holds information comprising a certificate of a group, to which a user of the client concerned belongs, signed by the private key of said user.

19. The certification apparatus for performing certification for an individual and a group in an organization constructed by hierarchically arranging a group having at least one of an individual and a group as a constituent member, comprising:

a certificate generating unit that generates a certificate for a certification target by signing signature-target information including a public key for said certification target and specifying information on said certification target by a private key used by the responsible person of a group directly including said certification target; and a unit that keeps said certificate generated.

* * * * *